(12) United States Patent
Watanabe et al.

(10) Patent No.: US 10,919,323 B2
(45) Date of Patent: Feb. 16, 2021

(54) ULTRASONIC SENSOR AND ELECTRONIC DEVICE

(71) Applicant: Seiko Epson Corporation, Tokyo (JP)

(72) Inventors: Ryoki Watanabe, Matsumoto (JP); Kanechika Kiyose, Matsumoto (JP)

(73) Assignee: Seiko Epson Corporation (JP)

( * ) Notice: Subject to any disclaimer, the term of this patent is extended or adjusted under 35 U.S.C. 154(b) by 42 days.

(21) Appl. No.: 16/356,496

(22) Filed: Mar. 18, 2019

(65) Prior Publication Data
US 2019/0283466 A1    Sep. 19, 2019

(30) Foreign Application Priority Data

Mar. 19, 2018  (JP) ................................ 2018-050565

(51) Int. Cl.
| | |
|---|---|
| *B41J 11/00* | (2006.01) |
| *B65H 7/02* | (2006.01) |
| *B41J 2/045* | (2006.01) |
| *G01S 15/06* | (2006.01) |

(52) U.S. Cl.
CPC ....... *B41J 11/0095* (2013.01); *B41J 2/04556* (2013.01); *B41J 11/009* (2013.01); *B65H 7/02* (2013.01); *B65H 2553/30* (2013.01); *G01S 15/06* (2013.01)

(58) Field of Classification Search
CPC .. B41J 11/0095; B41J 2/04556; B41J 11/009; B65H 7/02; B65H 2553/30; G01S 15/06
See application file for complete search history.

(56) References Cited

U.S. PATENT DOCUMENTS

| | | | | |
|---|---|---|---|---|
| 5,004,928 A | * | 4/1991 | Suzuki ..................... | B41J 29/00 250/559.16 |
| 6,283,471 B1 | * | 9/2001 | Kunzel .................... | B65H 7/06 271/227 |
| 2016/0345934 A1 | * | 12/2016 | Kojima ................. | H01L 41/047 |

FOREIGN PATENT DOCUMENTS

| | | |
|---|---|---|
| JP | 2010-139410 A | 6/2010 |
| JP | 2017-009567 A | 1/2017 |

* cited by examiner

*Primary Examiner* — Henok D Legesse
(74) *Attorney, Agent, or Firm* — Harness, Dickey & Pierce, P.L.C.

(57) ABSTRACT

An ultrasonic sensor includes an ultrasonic transceiver that transmits and receives an ultrasonic wave, and that outputs a reception signal by receiving the ultrasonic wave, and a position detection unit that detects a position of a target facing the ultrasonic transceiver, based on the reception signal. A plurality of the ultrasonic transceivers are arranged along a first direction. The position detection unit detects inclination of the target with respect to the first direction, based on the reception signals output from a plurality of the ultrasonic transceivers.

12 Claims, 19 Drawing Sheets

FIG. 21
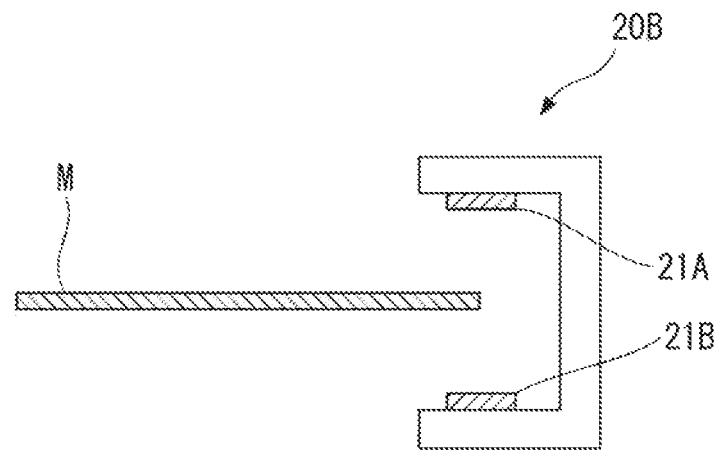
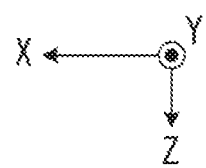
FIG. 22
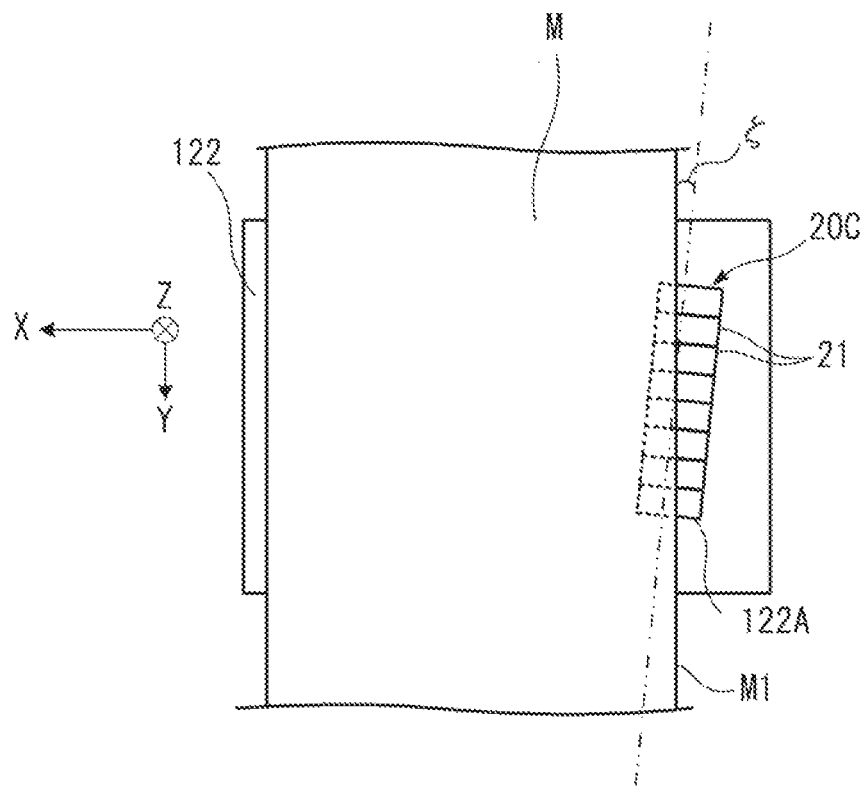

ULTRASONIC SENSOR AND ELECTRONIC DEVICE

BACKGROUND

1. Technical Field

The present invention relates to an ultrasonic sensor and an electronic device.

2. Related Art

In the related art, an ultrasonic device (edge detection sensor) is known which detects an edge (outer edge) of a target by using an ultrasonic wave (for example, refer to JP-A-2010-139410).

JP-A-2010-139410 discloses a printer which forms an image on a sheet. The printer has an edge sensor which detects the edge of the sheet. The edge sensor includes a transmitter which transmits the ultrasonic wave, a receiver which receives the ultrasonic wave, and a support member which connects the transmitter and the receiver to each other. The transmitter and the receiver are arranged across a transport path of the sheet. The transmitter transmits the ultrasonic wave to a predetermined detection region, and the receiver receives the ultrasonic wave passing through the detection region. In this manner, if a position of the sheet deviates on the transport path, a signal value of the ultrasonic wave received at the receiver is changed. Accordingly, it is possible to determine whether or not the position of the sheet is suitable.

However, according to the edge sensor as described above, a position of a sheet can be detected with respect to a direction intersecting a transport direction of the sheet (intersecting direction). However, it is not possible to detect whether or not the sheet is inclined with respect to the transport direction. For example, even if the sheet is properly located at a position of the edge sensor in the intersecting direction, the sheet may be inclined with respect to the transport direction in some cases. In this case, the printer disclosed in JP-A-2010-139410 disadvantageously determines that the position of the sheet is proper.

SUMMARY

An advantage of some aspects of the invention is to provide an ultrasonic sensor and an electronic device which can very accurately detect a position of a target.

An ultrasonic sensor according to an application example of the invention includes an ultrasonic transceiver that transmits and receives an ultrasonic wave, and that outputs a reception signal by receiving the ultrasonic wave, and a position detection unit that detects a position of a target facing the ultrasonic transceiver, based on the reception signal. A plurality of the ultrasonic transceivers are arranged along a first direction. The position detection unit detects inclination of the target with respect to the first direction, based on the reception signals output from a plurality of the ultrasonic transceivers.

In the application example, each of a plurality of the ultrasonic transceivers arranged in the first direction performs a transmission/reception process of the ultrasonic wave.

The application example, as the ultrasonic transceiver, may be configured such that a transmission unit for transmitting the ultrasonic wave and a reception unit for receiving the ultrasonic wave are arranged to face each other at a predetermined interval. Alternatively, the application example may be configured such that the ultrasonic wave is transmitted and received by the same transmission/reception unit, or such that the transmission unit and the reception unit are disposed on the same plane.

In a case where the transmission unit and the reception unit which face each other are disposed as the ultrasonic transceiver, some of the ultrasonic waves transmitted from the transmission unit are blocked by the target. That is, sound pressure of the ultrasonic waves received by the reception unit varies depending on an insertion quantity of the target inserted into a region where the transmission unit and the reception unit face each other.

In the ultrasonic transceiver, in a case where the ultrasonic wave is transmitted and received by the transmission/reception unit, or in a case where the transmission unit and the reception unit are disposed on the same plane, the ultrasonic wave reflected on the target is received. Even in this case, the sound pressure of the ultrasonic wave received by the reception unit varies depending on the insertion quantity of the target inserted into a range where the ultrasonic wave is transmitted by the transmission unit (transmission/reception unit).

Therefore, each of the ultrasonic transceivers can detect the insertion quantity of the target, that is, the position of the target, by using the signal strength of the reception signal output when the ultrasonic wave is received. Based on the position of the target detected by each of a plurality of the ultrasonic transceivers aligned in the first direction, the position detection unit can detect the inclination or an inclination angle of the target with respect to the first direction, in addition to the position of the target. That is, in the application example, compared to an ultrasonic sensor that measures only the position of the target in the related art, the inclination of the target can also be detected. Therefore, the position of the target can be very accurately detected.

It is preferable that the ultrasonic sensor according to the application example further includes a signal integration unit that outputs an integrated signal by integrating the reception signals output during a predetermined period and the position detection unit detects the position of the target, based on a magnitude relationship between signal strength of the integrated signal and a predetermined first reference value in each of a plurality of the ultrasonic transceivers, and detects the inclination of the target, based on the position of the target with respect to each of the ultrasonic transceivers.

In a case where the ultrasonic wave is transmitted from the ultrasonic transceiver toward the target as described above, the ultrasonic wave is reflected multiple times between the ultrasonic transceiver and the target. Therefore, after the ultrasonic wave (primary reflected component) initially reflected on the target is received, the ultrasonic waves reflected multiple times are sequentially received, and the reception signals corresponding thereto are sequentially output. Here, in a case where the position of the target is detected only using the signal strength of the reception signal, if the position where the ultrasonic wave is reflected multiple times fluctuates, the signal strength of the reception signal also fluctuates. Consequently, the position cannot be accurately detected.

In contrast, according to the application example with the configuration described above, the position of the target is detected, based on the integrated signal obtained by integrating the reception signals output during the predetermined period.

For example, in a case where the ultrasonic transceiver transmits the ultrasonic wave to the target and receives a reflected wave thereof, and in a case where the target deviates in a direction away from a transmission/reception area of the ultrasonic wave, the ultrasonic waves reflected on the target decrease. Accordingly, the signal strength of the integrated signal decreases. On the other hand, in a case where the target deviates so as to enter the transmission/reception area of the ultrasonic wave, the signal strength of the integrated signal increases.

In a case where the ultrasonic transceiver is configured to have the transmission unit and the reception unit which face each other so as to receive the ultrasonic wave which is not blocked by the target, and in a case where the target deviates in the direction away from the transmission/reception area of the ultrasonic wave, the ultrasonic waves reflected on the target decrease. Accordingly, the signal strength of the integrated signal increases. On the other hand, in a case where the target deviates so as to enter the transmission/reception area of the ultrasonic wave, the signal strength of the integrated signal decreases.

In this way, in a case of using the integrated signal obtained by integrating the reception signals output during the predetermined period, if the position of the target does not vary, the signal strength of the integrated signal has a constant value. Therefore, the signal strength of the integrated signal is compared with the first reference value so as to detect the position of the target, based on the magnitude relationship. Accordingly, irrespectively of whether the ultrasonic wave is reflected multiple times, the position of the target can be very accurately detected.

In the ultrasonic sensor according to the application example, it is preferable that the ultrasonic transceiver has a plurality of transmission/reception regions arranged along a second direction intersecting the first direction, and the position detection unit detects the position of the target, based on the reception signal output from each of a plurality of the transmission/reception regions in each of a plurality of the ultrasonic transceivers, and detects the inclination of the target, based on the position of the target with respect to each of the ultrasonic transceivers.

In the application example with this configuration, each of the ultrasonic transceivers has a plurality of the transmission/reception regions arranged along the second direction, and the transmission/reception regions respectively and independently transmit and receive the ultrasonic wave. According to this configuration, based on a transmission/reception result of the ultrasonic wave in each of the transmission/reception regions, the transmission/reception region which the target faces can be identified. Therefore, the position of the target facing each of the ultrasonic transceivers can be detected.

In the ultrasonic sensor according to the application example, it is preferable that a plurality of the ultrasonic transceivers respectively have mutually different frequencies of the ultrasonic waves to be transmitted and received.

In the application example with this configuration, the respective ultrasonic transceivers have the mutually different frequencies of the ultrasonic waves to be transmitted and received. Accordingly, crosstalk can be suppressed between the ultrasonic transceivers adjacent to each other. In this manner, each of the ultrasonic transceivers can accurately perform a transmission/reception process of the ultrasonic wave, and accuracy in detecting the position of the target can be improved.

In the ultrasonic sensor according to the application example, it is preferable that the ultrasonic sensor further includes a ratio calculation unit that calculates a ratio between signal strength of the reception signal output when the target is located at a reference position and a predetermined second reference value.

For example, as the reference position, a position where the target is inserted as much as a predetermined insertion quantity into the transmission area for transmitting the ultrasonic wave from the ultrasonic transceiver can be used as an example. For example, in a case where the ultrasonic transceiver is configured to include the transmission unit and the reception unit which are arranged to face each other, a position where the target is not inserted into the transmission area of the ultrasonic wave (position separated as much as a predetermined distance from the ultrasonic transceiver) may be used as the reference position.

An attenuation factor of the ultrasonic wave varies depending on environmental values such as temperature, humidity, and atmospheric pressure of a medium (for example, air) through which the ultrasonic wave is propagated. Therefore, even if the positions of the target are the same as each other, if the environment such as the temperature and the humidity vary, the signal strength of the reception signal also varies when the ultrasonic wave is transmitted and received by the ultrasonic transceiver.

In the application example with the configuration described above, the ratio is calculated between the signal strength of the reception signal when the target is located at the reference position and the predetermined second reference value. For example, the second reference value is the signal strength of the reception signal when the environment value (temperature, humidity, or atmospheric pressure) is set to a preset value and the target is located at the reference position. In this manner, it is possible to determine how much the reception signal varies depending on the environmental value by using the ratio therebetween.

In a case where there is no variation in the position of the target, if the environmental value fluctuates, the signal strength of each reception signal output from each of the ultrasonic transceivers uniformly fluctuates at the same (or substantially the same) ratio. On the other hand, in a case where there is a variation in the position of the target, only the reception signal varies which is output from the ultrasonic transceiver where the position of the facing edge portion varies, out of a plurality of the ultrasonic transceivers. Therefore, when the reception signal varies, it is possible to determine whether the reception signal varies due to the variation in the position of the target or whether the reception signal varies due to the variation in the environment.

Furthermore, in a case where the environmental value fluctuates, the ratio is calculated as described above. In this manner, it is possible to correct the reception signal output from each of the ultrasonic transceivers or the first reference value. Therefore, the accuracy in detecting the position of the target can be improved.

An electronic device according to an application example of the invention includes the ultrasonic sensor as described above, and a position determination unit that determines whether or not the target is properly located, based on the position of the target detected by the ultrasonic sensor.

In the electronic device according to the application example, the position determination unit determines whether or not the target is located at the proper position, based on the position of the target detected by the ultrasonic sensor. As described above, as the position of the target, the ultrasonic sensor can also detect the inclination of the target with respect to the first direction. Therefore, the position determination unit can very accurately determine whether or not the target is properly located.

It is preferable that the electronic device according to the application example further includes a transport unit that transports the target in which a portion of an outer peripheral edge is a linear edge portion so that a linear direction of the edge portion falls within a predetermined allowable angle with respect to a predetermined third direction, and an angle formed between the first direction and the third direction is smaller than the allowable angle.

In the application example with this configuration, the transport unit transports the target having the linear edge portion along the third direction. In this case, the target transported by the transport unit is transported so that an angle formed by the linear direction is smaller than the predetermined allowable angle with respect to the third direction. In the application example, an arrangement is made so that an angle formed by the first direction which is the aligning direction of a plurality of the ultrasonic transceivers in the ultrasonic sensor is smaller than the allowable angle with respect to the third direction.

According to this configuration, when the target is transported by the transport unit, in a case where the target is inclined with respect to the third direction serving as the transport direction, the signal strength of the reception signal output from each of the ultrasonic transceivers has a value which varies depending on the inclination angle. Therefore, the inclination of the target can be preferably detected.

In the electronic device according to the application example, it is preferable that the first direction and the third direction are the same as each other.

In the application example with this configuration, the first direction and the third direction are the same as each other. In this case, when the edge portion of the target is transported so as to be parallel to the third direction, the reception signal output from the respective ultrasonic transceivers have the same or substantially the same signal strength. Therefore, for example, since variations in the reception signal are detected, it is possible to easily determine whether or not the inclination of the target falls within an allowable value.

BRIEF DESCRIPTION OF THE DRAWINGS

The invention will be described with reference to the accompanying drawings, wherein like numbers reference like elements.

FIG. 21 is a schematic view illustrating a schematic configuration of an edge detection sensor according to Modification Example 4.

FIG. 22 is a view illustrating a located example of an ultrasonic transceiver of an edge detection sensor according to Modification Example 5.

DESCRIPTION OF EXEMPLARY EMBODIMENTS

First Embodiment

Hereinafter, a first embodiment according to the invention will be described.

In the present embodiment, a printer will be described which is an electronic device in which an edge detection sensor is incorporated as an ultrasonic device according to the invention.

Schematic Configuration of Printer

Figure 1:
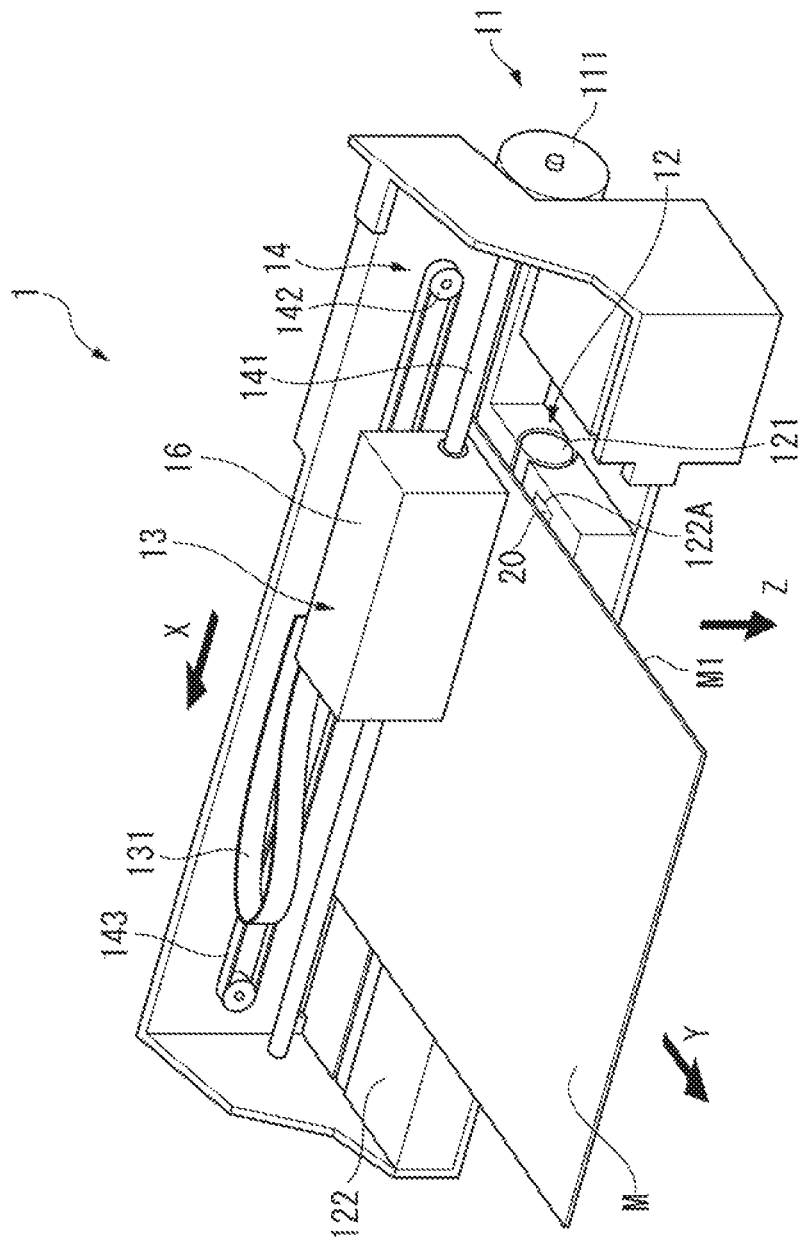
FIG. 1 is a perspective view illustrating an external configuration example of a printer according to a first embodiment.
Figure 2:
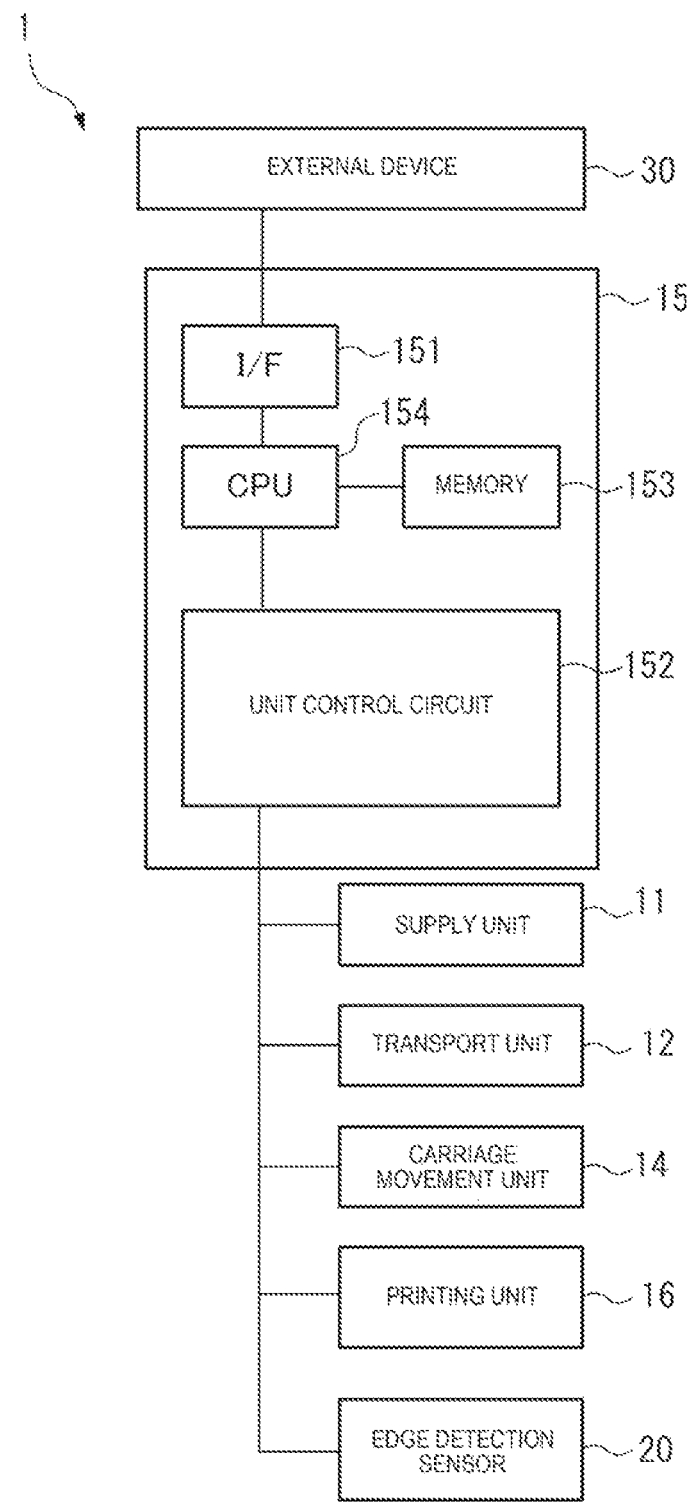
FIG. 2 is a block diagram illustrating a schematic configuration of the printer according to the first embodiment.

FIG. 1 is a perspective view illustrating an external configuration example of a printer 1 according to the present embodiment. FIG. 2 is a block diagram illustrating a schematic configuration of the printer 1 according to the present embodiment.

As illustrated in FIG. 1, the printer 1 includes a supply unit 11, a transport unit 12, a carriage 13, a carriage movement unit 14, and a control unit 15 (refer to FIG. 2).

The printer 1 controls the respective units 11, 12, and 14, and the carriage 13, based on print data input from an external device 30, for example, such as a personal computer, and prints an image on a medium M. In this case, in order to form the image at a desired position on the medium M (target), the printer 1 transports the medium M in a transport direction (Y-direction) by the transport unit 12. An edge detection sensor 20 detects a position of a linear portion (edge portion M1) extending along the transport direction in an outer peripheral edge of the medium M. If the edge detection sensor 20 determines that the edge portion M1 of the medium M deviates from a reference position, the control unit 15 issues an alarm, for example, to a user so as to correct the position of the medium M.

Hereinafter, each configuration of the printer 1 will be described in detail.

The supply unit 11 supplies the medium M serving as an image forming target to an image forming position. For example, the supply unit 11 includes a roll body 111 (refer to FIG. 1) around which the medium M is wound, a roll drive motor (not illustrated), and a roll drive train wheel (not illustrated). Based on a command from the control unit 15, the roll drive motor is rotationally driven, thereby rotating the roll body 111 via the roll drive train wheel. In this manner, a sheet wound around the roll body 111 is supplied to a downstream side (+Y-side) in the transport direction (Y-direction).

In the present embodiment, an example will be described in which the supply unit 11 supplies the sheet wound around the roll body 111. However, the invention is not limited thereto. For example, the medium M such as the sheet loaded on a tray may be supplied one by one by using a roller. The medium M may be supplied using any supply method.

The transport unit 12 transports the medium M supplied from the supply unit 11 along the Y-direction. That is, the Y-direction corresponds to a third direction according to the invention. For example, the transport unit 12 includes a transport roller 121, a driven roller (not illustrated) driven to follow the transport roller 121 while being located across the transport roller 121 and the medium M, and a platen 122.

The transport roller 121 is rotated in such a way that a transport motor (not illustrated) is controlled and driven by the control unit 15, and transports the medium M in the Y-direction in a state where the medium M is interposed between the driven roller and the transport roller 121.

In transporting the medium M by using the transport unit 12, a transport amount by using the transport roller 121 is adjusted in advance so that the transport amounts are the same on the ±X-sides. In this manner, even in a case where the medium M has variations in thickness, the medium M is transported by the transport unit 12 so that a linear direction extending along the edge portion M1 of the medium M falls within a predetermined allowable angle ζ with respect to the Y-direction serving as the transport direction.

The platen 122 (mounting table) facing the carriage 13 is disposed on a downstream side (+Y-side) of the transport roller 121 in the Y-direction. In the present embodiment, the edge detection sensor 20 is disposed in the platen 122.

The edge detection sensor 20 will be described in detail later.

The carriage 13 is equipped with a printing unit 16 which prints an image by ejecting an ink to the medium M.

Based on a command signal output from the control unit 15, the printing unit 16 performs a printing process (image forming process for the medium M) as follows. The printing unit 16 in a portion facing the medium M ejects the ink individually onto the medium M so as to form the image on the medium M.

Based on a command output from the control unit 15, the carriage movement unit 14 causes the carriage 13 to reciprocate along the X-direction.

For example, as illustrated in FIG. 1, the carriage movement unit 14 is configured to include a carriage guide shaft 141, a carriage motor 142, and a timing belt 143.

The carriage guide shaft 141 is located along the X-direction, and both end portions thereof are fixed to a casing of the printer 1, for example. The carriage motor 142 drives the timing belt 143. The timing belt 143 is supported substantially in parallel with the carriage guide shaft 141, and a portion of the carriage 13 is fixed to the timing belt 143. If the carriage motor 142 is driven based on the command of the control unit 15, the timing belt 143 is driven forward and rearward, and the carriage 13 fixed to the timing belt 143 is guided by the carriage guide shaft 141 so as to reciprocate.

As illustrated in FIG. 2, the control unit 15 is configured to include an I/F 151, a unit control circuit 152, a memory 153, and a central processing unit (CPU) 154.

Through the I/F 151, print data input from the external device 30 is input to the CPU 154.

The unit control circuit 152 includes control circuits for respectively controlling the supply unit 11, the transport unit 12, the carriage movement unit 14, the printing unit 16, and the edge detection sensor 20, and controls an operation of each unit, based on a command signal output from the CPU 154. The control circuit of each unit may be disposed separately from the control unit 15, and may be connected to the control unit 15.

The memory 153 stores various programs or various data items for controlling the operation of the printer 1. For example, the various data items include print profile data for storing an ejection amount of each ink for color data included as print data.

The CPU 154 reads and executes the various programs stored in the memory 153, thereby performing drive control of the supply unit 11, the transport unit 12, and the carriage movement unit 14, and print control of the printing unit 16.

The CPU 154 determines whether or not a position of the medium M is proper, based on a position of the medium M, which is input from the edge detection sensor 20. That is, the CPU 154 functions as a position determination unit according to the invention. If the CPU 154 determines that the position of the medium M is not proper, the CPU 154 outputs an error message notifying the user of a position deviation of the medium M, and displays the message, for example, on the external device 30 (display), or issues an audible alarm sound to the user.

Configuration of Edge Detection Sensor 20

Figure 3:
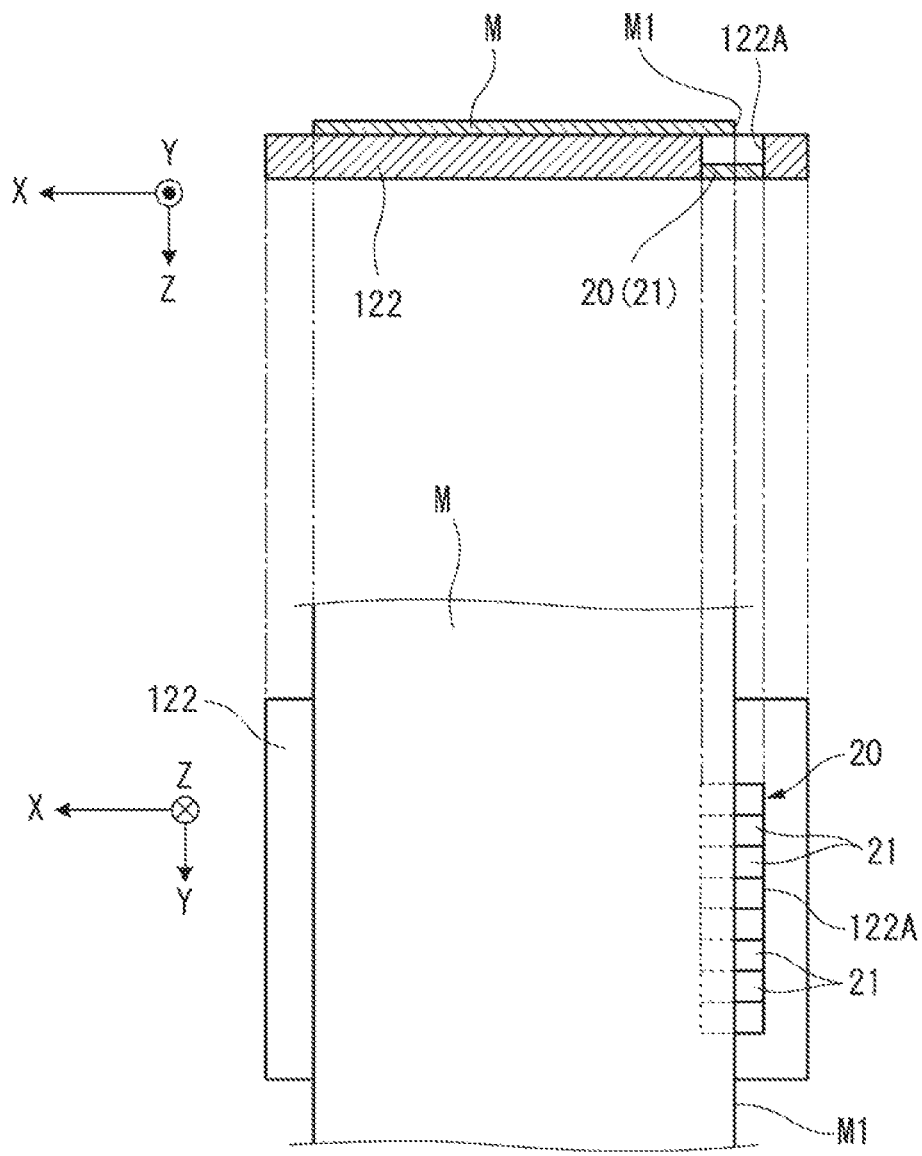
FIG. 3 is a view illustrating a located position of an edge detection sensor according to the first embodiment.

FIG. 3 is a view illustrating a located position of the edge detection sensor according to the present embodiment.

As illustrated in FIG. 3, the platen 122 has a detection hole 122A at a position facing the edge (edge portion M1) along the Y-direction of an end portion on the −X-side of the medium M. The detection hole 122A has the edge detection sensor 20 serving as an ultrasonic sensor according to the invention. In the present embodiment, an example has been described in which the detection hole 122A and the edge detection sensor 20 are disposed at the position facing the edge portion M1 in the end portion on the −X-side of the medium M. Alternatively, both of these may be disposed at the position facing the edge portion in the end portion on the +X-side of the medium M, may be disposed on both end portions on the ±X-side of the medium M.

Figure 4:
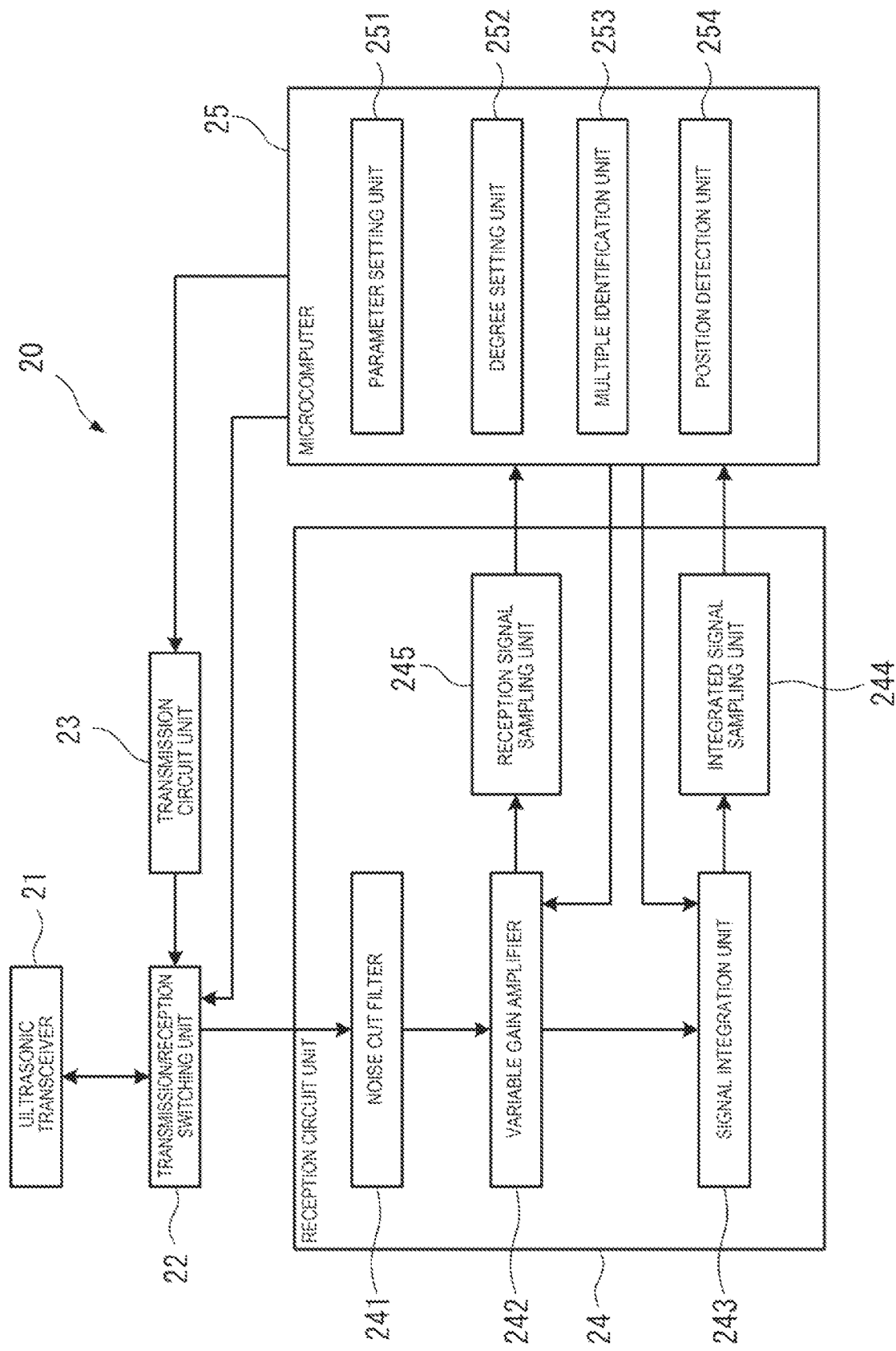
FIG. 4 is a block diagram illustrating a schematic configuration of the edge detection sensor according to the first embodiment.
Figure 5:
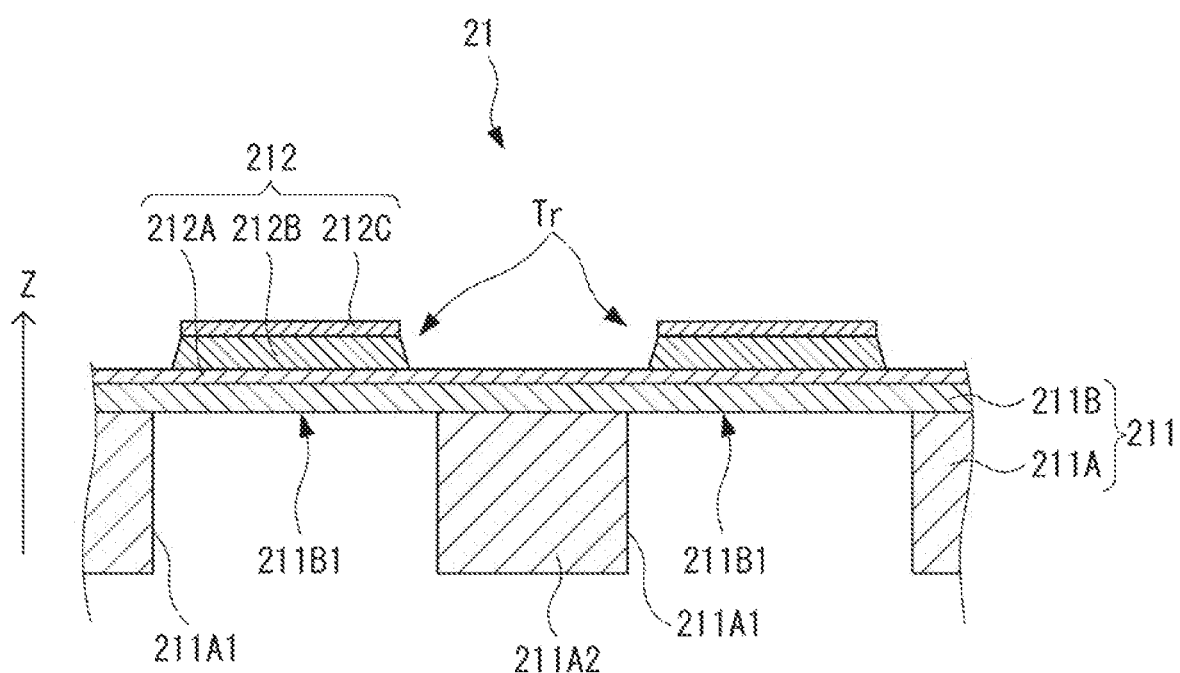
FIG. 5 is a sectional view illustrating a schematic configuration of an ultrasonic transceiver according to the first embodiment.

FIG. 4 is a block diagram illustrating a schematic configuration of the edge detection sensor 20. FIG. 5 is a sectional view illustrating a schematic configuration of an ultrasonic transceiver 21.

As illustrated in FIG. 4, the edge detection sensor 20 according to the present embodiment includes the ultrasonic transceiver 21, a transmission/reception switching unit 22, a transmission circuit unit 23, a reception circuit unit 24, and a microcomputer 25.

Configuration of Ultrasonic Transceiver 21

The ultrasonic transceiver 21 transmits the ultrasonic wave from the detection hole 122A toward the −Z-side, and receives the ultrasonic wave reflected on the medium M. As illustrated in FIG. 3, a plurality of the ultrasonic transceivers 21 are arranged along the Y-direction, and are respectively and independently driven. That is, according to the present embodiment, a first direction serving as an arrangement direction of a plurality of the ultrasonic transceivers 21 is the Y-direction, and is the same as the third direction serving as the transport direction of the medium M.

FIG. 3 illustrates an example in which the respective ultrasonic transceivers 21 are continuous with (adjacent to) each other in the Y-direction. However, the respective ultrasonic transceivers 21 may be arranged at a predetermined interval, and a configuration may be adopted in which a partition wall for partitioning the detection hole 122A is disposed at a boundary position of the respective ultrasonic transceivers 21.

For example, as illustrated in FIG. 5, the ultrasonic transceiver 21 is configured to include an element substrate 211 and a piezoelectric element 212.

As illustrated in FIG. 5, the element substrate 211 includes a substrate main body portion 211A and a vibration membrane 211B disposed on one surface side (for example, the +Z-side) of the substrate main body portion 211A.

The substrate main body portion 211A is a substrate for supporting the vibration membrane 211B, and is configured to include a semiconductor substrate made of Si, for example. The substrate main body portion 211A has an opening portion 211A1 penetrating the substrate main body portion 211A along the Z-direction. An opening width of the opening portion 211A1 defines a frequency of the ultrasonic wave transmitted and received by the ultrasonic transceiver 21. According to the present embodiment, the ultrasonic transceivers 21 respectively have mutually different dimensions for the opening width of the opening portion 211A1. That is, the frequencies of the ultrasonic waves transmitted and received by the respective ultrasonic transceivers 21 are different from each other.

The vibration membrane 211B is formed of $SiO_2$, or is configured to include a stacked body formed of $SiO_2$ and $ZrO_2$, for example, the vibration membrane 211B is disposed on the +Z-side of the substrate main body portion 211A. The vibration membrane 211B is supported by a partition wall 211A2 configuring the opening portion 211A1, and closes the +Z-side of the opening portion 211A1. A portion of the vibration membrane 211B which overlaps the opening portion 211A1 when viewed in the Z-direction configures a vibration portion 211B1.

The piezoelectric element 212 is disposed on one surface (for example, a surface on the +Z-side) of the vibration membrane 211B, and at a position overlapping the each vibration portion 211B1 (each opening portion 211A1) when viewed in the Z-direction. As illustrated in FIG. 5, the piezoelectric element 212 is configured so that a first electrode 212A, a piezoelectric film 212B, and a second electrode 212C are sequentially stacked on the vibration membrane 211B.

Here, one ultrasonic transducer Tr (transmission/reception element) is configured to include one vibration portion 211B1 and the piezoelectric element 212 disposed on the vibration portion 211B1.

Figure 6:
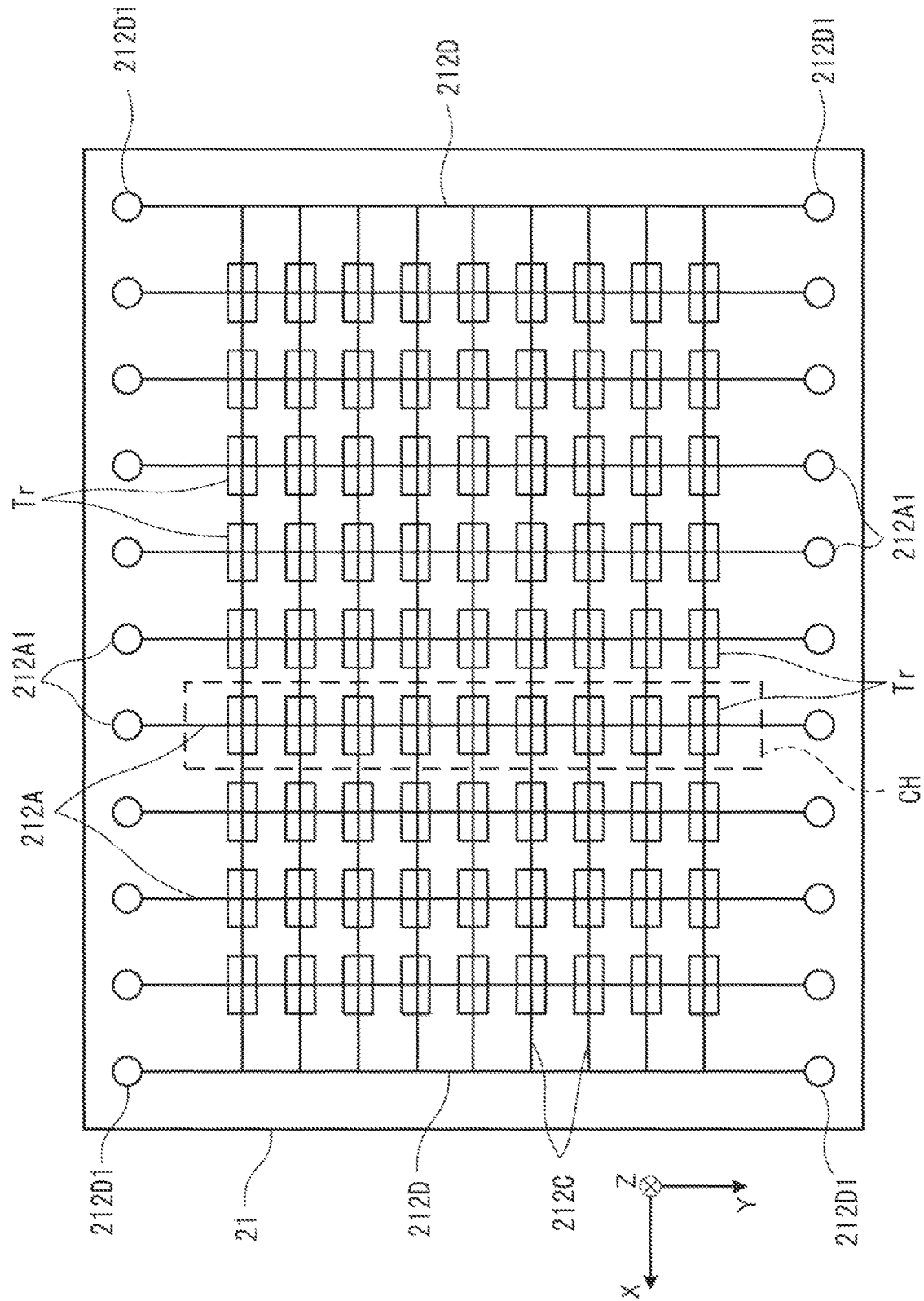
FIG. 6 is a schematic view illustrating a located example of an ultrasonic transducer in one ultrasonic transceiver according to the first embodiment.

FIG. 6 is a schematic view illustrating a located example of the ultrasonic transducer Tr in one of the ultrasonic transceivers 21.

In the present embodiment, as illustrated in FIG. 6, in the ultrasonic transceiver 21, the ultrasonic transducer Tr is located in a two-dimensional array structure extending along the X-direction and the Y-direction.

Specifically, the first electrodes 212A of a plurality of the ultrasonic transducers Tr located in the Y-direction are connected to each other, and are connected to the transmission/reception switching unit 22 from a first terminal portion 212A1 disposed in an end portion on the ±Y-side.

The second electrodes 212C of a plurality of the ultrasonic transducers Tr located in the X-direction are connected to each other, and are connected using a common electrode 212D in an end portion on the ±X-side, for example. The common electrode 212D connects a plurality of the second electrodes 212C aligned in the Y-direction to each other, and is connected to a second terminal portion 212D1 disposed in an end portion on the ±Y-side, for example. The second terminal portion 212D1 is connected to a common potential circuit (not illustrated), and a common potential (for example, −3V) is applied thereto.

According to this configuration, one transmission/reception row CH is configured to include a plurality of the ultrasonic transducers Tr located in the Y-direction, and a plurality of the transmission/reception rows CH are aligned in the X-direction. That is, each of the transmission/reception rows CH configures a transmission/reception region according to the invention, and the X-direction which is the alignment direction of the respective transmission/reception rows CH is a second direction according to the invention.

The present embodiment adopts the two-dimensional array structure where the ultrasonic transducers Tr are located parallel to the X-direction and the Y-direction. Accordingly, the second direction which is the alignment direction of the transmission/reception rows CH is the X direction. However, the second direction may be a direction intersecting the Y-direction at an angle other than an angle perpendicular to the Y-direction. That is, the transmission/reception rows CH may be aligned in a direction intersecting the Y-direction.

The ultrasonic transceiver 21 applies a pulse wave voltage having a predetermined frequency between the first electrode 212A and the second electrode 212C of each ultrasonic transducer Tr, thereby causing the piezoelectric film 212B to expand and contract. The vibration portion 211B1 having the piezoelectric element 212 vibrates at a frequency corresponding to an opening width of the opening portion 211A1, and the ultrasonic wave is transmitted from the −Z-side (detection hole 122A side) of the vibration portion 211B1. In the present embodiment, a transmission range in which the ultrasonic wave is transmitted by the ultrasonic transceiver 21 is inside the detection hole 122A in an XY-plane.

If the ultrasonic wave reflected on the medium M is input to the ultrasonic transducer Tr from the detection hole 122A side through the opening portion 211A1, the vibration portion 211B1 vibrates, and a potential difference is generated between the upper portion and the lower portion of the piezoelectric film 212B. In this manner, the reception signal corresponding to the potential difference is output, and the reception signal is detected. Accordingly, the reception of the ultrasonic wave is detected.

Configuration of Transmission/Reception Switching Unit 22, Transmission Circuit Unit 23, and Reception Circuit Unit 24

The transmission/reception switching unit 22, the transmission circuit unit 23, and the reception circuit unit 24 are disposed one by one for each one of the ultrasonic transceivers 21.

The transmission/reception switching unit 22 is connected to each of the ultrasonic transducer Tr, the transmission circuit unit 23, and the reception circuit unit of the ultrasonic transceiver 21. The transmission/reception switching unit 22 is configured to include a switching circuit, and switches the transmission connection for connecting each ultrasonic transducer Tr and the transmission circuit unit 23, and the reception connection for connecting each ultrasonic transducer Tr and the reception circuit unit 24.

The transmission circuit unit 23 is connected to the transmission/reception switching unit 22 and the microcomputer 25. When the transmission/reception switching unit 22 is switched to the transmission connection, based on the control of the microcomputer 25, the transmission circuit unit 23 outputs a drive signal to the each ultrasonic transducer Tr, and transmits the ultrasonic wave from the ultrasonic transceiver 21.

The reception circuit unit 24 is connected to the transmission/reception switching unit 22 and the microcomputer 25. When the transmission/reception switching unit 22 is switched to the reception connection, the reception signal transmitted from each ultrasonic transducer Tr is input to the reception circuit unit 24.

The reception circuit unit 24 is configured to include a noise cut filter 241, a variable gain amplifier 242, a signal integration unit 243, an integrated signal sampling unit 244, and a reception signal sampling unit 245.

The noise cut filter 241 removes noise included in the reception signal. For example, it is possible to use a low-pass filter which removes a high frequency component. The noise cut filter 241 may be provided with a low voltage cutting function to cut off a signal having predetermined signal strength or weaker.

The variable gain amplifier 242 is configured so that the gain can be changed under the control of the microcomputer 25. The reception signal output from the variable gain amplifier 242 is input to the signal integration unit 243 and the microcomputer 25.

The signal integration unit 243 outputs the integrated signal obtained by integrating the reception signals within each predetermined period (predetermined time). The signal integration unit 243 integrates the added reception signals obtained by adding the reception signals output from the respective transmission/reception rows CH, and outputs the integrated signal.

The integrated signal sampling unit 244 samples the integrated signal at a predetermined sampling frequency.

The reception signal sampling unit 245 samples the reception signal output from the variable gain amplifier 242 at a predetermined sampling frequency. The reception signal sampling unit 245 samples each of the reception signals output from the respective transmission/reception rows CH.

Configuration of Microcomputer 25

The microcomputer 25 (microcontroller) controls the operation of the edge detection sensor 20. The microcomputer 25 reads and executes a program stored in an internal memory, thereby functioning as a parameter setting unit 251, a degree setting unit 252, a multiple identification unit 253, and a position detection unit 254.

The parameter setting unit 251 sets each parameter used for an edge detection process (main measurement) of the medium M which is performed by the edge detection sensor 20 (performing calibration process). The parameter setting unit 251 also functions as a ratio calculation unit according to the invention, and calculates a ratio between the signal strength of the reception signal when the medium M is located at a reference position and a second reference value set in advance.

The degree setting unit 252 sets a degree (first degree) of the reception signal to be integrated by the signal integration unit 243, based on the reception signal when the calibration process is performed. That is, the signal integration unit 243 integrates the reception signals in such away that a predetermined period from the transmission timing of the ultrasonic wave until the reception of the reception signal generated by the multiple reflection ultrasonic wave in the first degree is set as an integration time τ. In the present embodiment, as the first degree, the degree setting unit 252 sets a maximum degree N of the reception signal in which the signal strength of the reception signal is equal to or greater than a first threshold.

Based on the reception signal when the calibration process is performed, the multiple identification unit 253 calculates a reception cycle by identifying the reception signal when the multiple reflection ultrasonic wave is received.

Based on the signal strength of the integrated signal in the edge detection process after the calibration process is performed, the position detection unit 254 detects the position of the medium M, that is, a deviation from the reference position of the medium M and inclination of the medium M.

Ultrasonic Measurement Method

Next, an ultrasonic measurement method of the edge detection sensor 20 in the above-described printer 1 will be described.

According to the present embodiment, as preprocessing for detecting the position of the medium M, for example, when the power of the printer 1 is turned on or immediately before the printing process, the calibration process of the edge detection sensor 20 is performed.

Calibration Process

Figure 7:
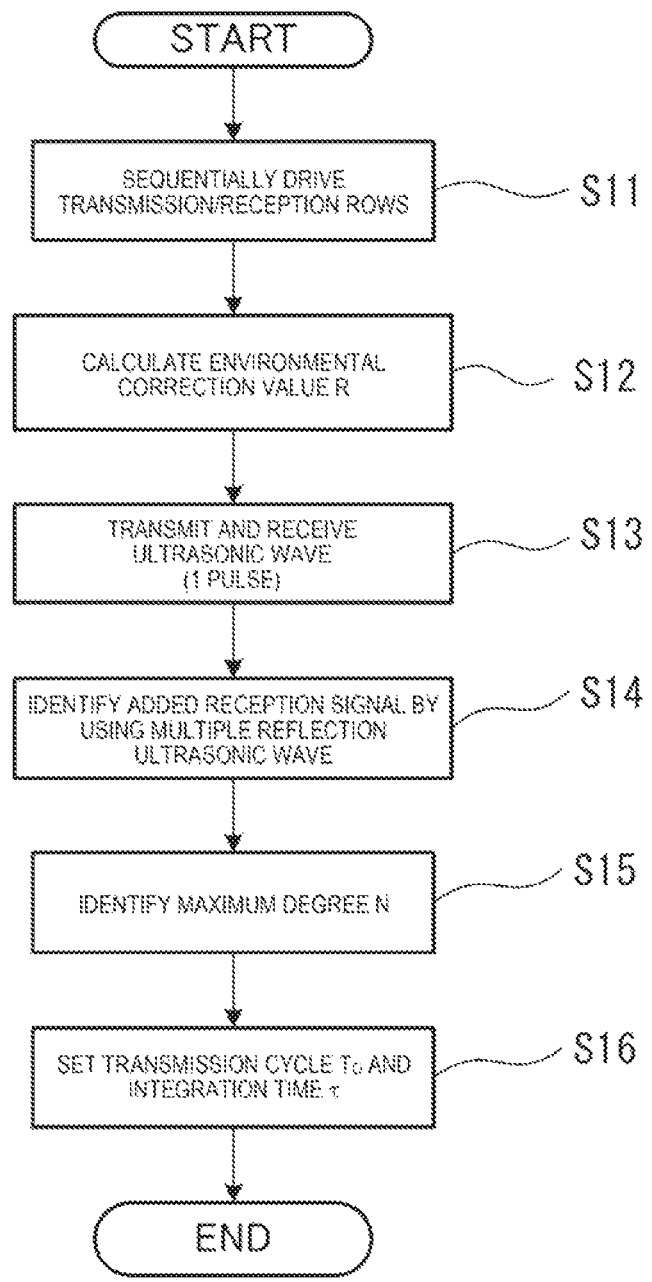
FIG. 7 is a flowchart of a calibration process according to the first embodiment.

FIG. 7 is a flowchart illustrating the calibration process.

In the calibration process, as illustrated in FIG. 3, the medium M is transported, and the position (reference position) of the medium M is set so that the edge portion M1 along the Y-direction of the medium M is located at the center in the X-direction of the detection hole 122A. That is, the medium M is located at the reference position. In this manner, a range of ½ of the transmission range where the ultrasonic wave is transmitted by the ultrasonic transceiver 21, that is, a half of the detection hole 122A is covered with the medium M.

In the calibration process, the microcomputer 25 controls the transmission/reception switching unit 22, the transmission circuit unit 23, and the reception circuit unit 24, and sequentially drives the respective transmission/reception rows CH of one ultrasonic transceiver 21 (for example, the ultrasonic transceiver 21 located at the center in the Y-direction) set in advance from a plurality of the ultrasonic transceivers 21 (Step S11). In this manner, the ultrasonic waves are sequentially transmitted from the respective transmission/reception rows CH, and the reception signal is output by receiving the reflected wave reflected on the medium M.

Figure 8:
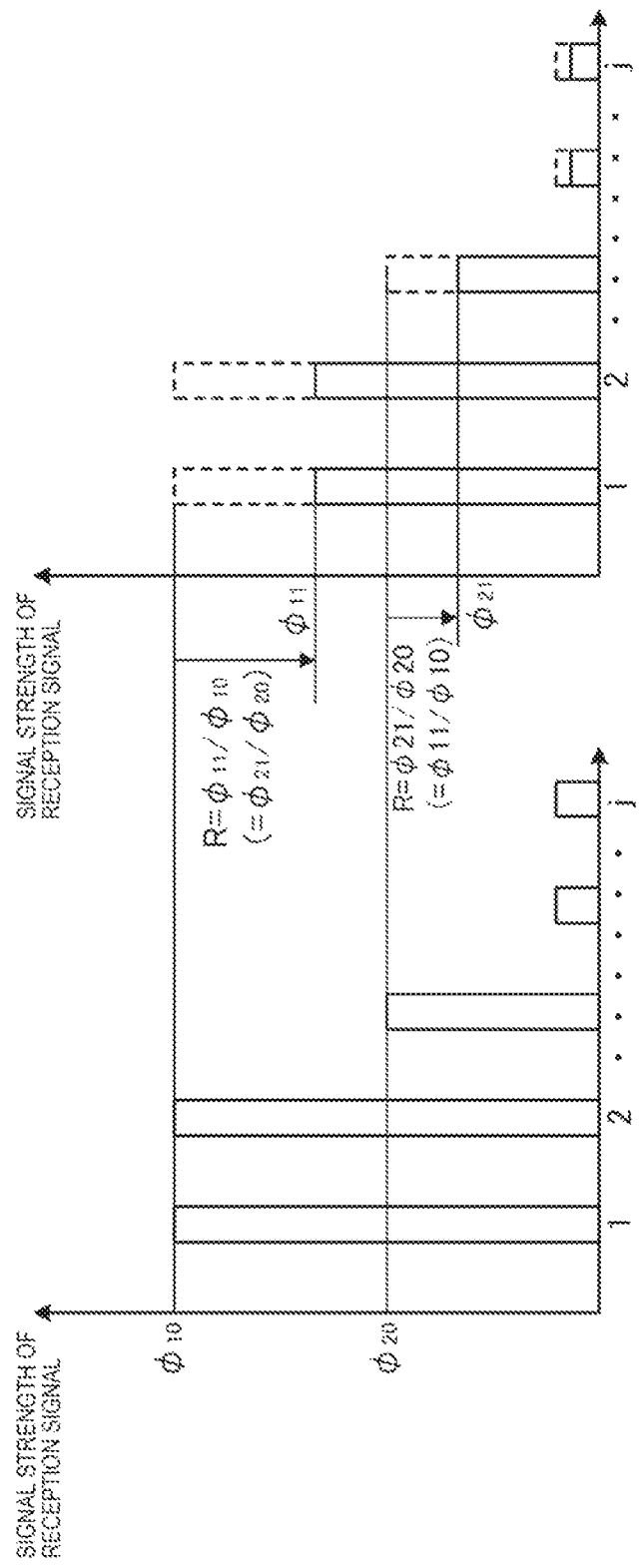
FIG. 8 is a view illustrating an example of signal strength of a reception signal output from each transmission/reception row when an ultrasonic wave is transmitted by locating a medium at a reference position according to the first embodiment.

FIG. 8 illustrates an example of the signal strength of the reception signal which is output from the respective transmission/reception rows CH. A left drawing in FIG. 8 illustrates an example of the reception signal (reference reception signal) in a case where environmental values (parameters such as room temperature, humidity, and atmospheric pressure) in an installation environment of the edge detection sensor 20 are reference environmental values set in advance. On the other hand, a right drawing in FIG. 8 illustrates an example of the signal strength of the reception signal in a case where the installation environment of the edge detection sensor 20 fluctuates. In FIG. 8, a horizontal axis indicates a position of the transmission/reception row CH from which the ultrasonic wave is received, and the transmission/reception row CH located at an end portion on the +X side is set to "1".

If the respective transmission/reception rows CH are sequentially driven, the ultrasonic wave whose sound pressure reflected on the medium M is high is received in the transmission/reception row CH facing the medium M, and the reception signal having the strong signal strength is output. On the other hand, in the transmission/reception row CH located at a position facing the edge portion M1, the signal strength of the reception signal decreases since some of the ultrasonic waves are not reflected on the medium M. In the transmission/reception row CH at a position which does not face the medium M, the signal strength of the reception signal further decreases.

Incidentally, when the ultrasonic wave is transmitted from the ultrasonic transceiver 21, an attenuation factor of the ultrasonic wave fluctuates depending on a state of a medium (air) which propagates the ultrasonic wave. For example, in a case where the humidity in the air which propagates the ultrasonic wave is high, the ultrasonic wave greatly attenuates, compared to a case where the humidity is low.

Therefore, as illustrated in FIG. 8, if the installation environment of the edge detection sensor 20 fluctuates and the ultrasonic wave propagated in the air attenuates, the signal strength of the reception signal decreases. In a case where the ultrasonic wave attenuates due to the fluctuations in the environmental value, the ratios of variations in the signal strengths of the reception signals are the same (or substantially the same) as each other in the respective transmission/reception rows CH. Therefore, in a case where the signal strength of the reception signal increases or decreases at the same rate from the respective transmission/reception rows CH, it is possible to easily determine that the signal strength decreases due to the fluctuations in the environmental value, not due to position misalignment or inclination of the medium M.

As an environmental correction value R, the parameter setting unit 251 calculates a ratio (signal strength of the reception signal/second reference value) between the signal strength of the reception signal obtained in Step S11 and the signal strength (second reference value) of the reference reception signal stored in an internal memory, for example (Step S12). In this case, it is preferable that the parameter setting unit 251 calculates the environmental correction value R by targeting the reception signal whose signal strength is maximized out of the reception signals output from the transmission/reception rows CH. That is, the environmental correction value R is calculated by using the reception signal of the transmission/reception row CH covered by the medium M when the medium M is located at the reference position, out of a plurality of the transmission/reception rows CH. More preferably, the reception signal of the transmission/reception row CH located in an end portion on the +X side is used. In this way, the reception signal whose signal strength is maximized is used. Accordingly, it is possible to very accurately calculate the environmental correction value R in which the influence of noise or the like is suppressed.

The parameter setting unit 251 may calculate the ratio between each of the reception signals output from the respective transmission/reception rows CH and the reference reception signal corresponding to the respective transmission/reception rows CH, and may adopt a representative value thereof as the environmental correction value R. For example, as the representative value, an average value or a mode value can be used.

Next, the microcomputer 25 controls the transmission/reception switching unit 22, the transmission circuit unit 23, and the reception circuit unit 24 so that the respective ultrasonic transceivers 21 perform the transmission/reception process of the ultrasonic wave (Step S13).

In Step S13, the parameter setting unit 251 simultaneously inputs single pulse drive voltages to the respective transmission/reception rows CH of the ultrasonic transceiver 21, and transmits single pulse ultrasonic waves from the respective ultrasonic transducers Tr.

In Step S13, the reception signal output from the variable gain amplifier 242 is sampled by the reception signal sampling unit 245, and is input to the microcomputer 25. The reception signal sampling unit 245 samples the reception signal for the respective transmission/reception rows CH. In Step S13, the parameter setting unit 251 generates an added reception signal obtained by adding the reception signals output from the respective transmission/reception rows CH sampled at the same timing.

Figure 9:
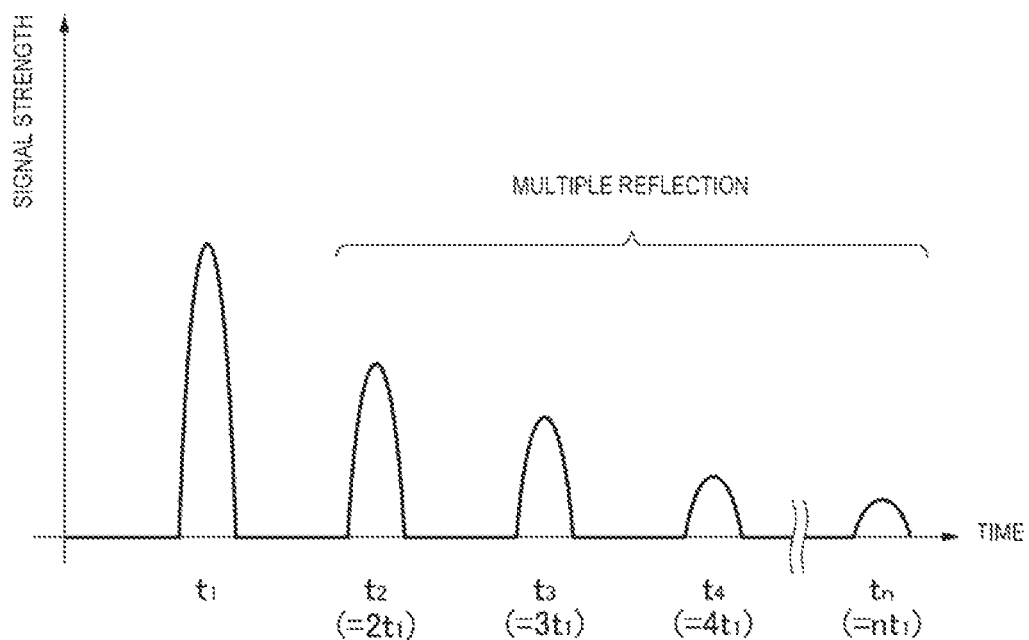
FIG. 9 is a view illustrating an example of a transmission/reception result of the ultrasonic wave in Step S13 illustrated in FIG. 7.

FIG. 9 is a view illustrating an example of a transmission/reception result of the ultrasonic wave in Step S13, and illustrates the signal strength of the added reception signal which is changed with the lapse of time.

As illustrated in FIG. 9, if the ultrasonic wave is transmitted from the ultrasonic transceiver 21, at the reception timing at which an elapsed time t from the transmission timing of the ultrasonic wave satisfies $t=t_1$, a primary reflection ultrasonic wave reflected on the medium M first time is received by the ultrasonic transceiver 21, and a primary reception signal is output. The ultrasonic wave is reflected multiple times between the ultrasonic transceiver 21 and the medium M. The reception signal is also received when the multiple reflection component is received by the ultrasonic transceiver 21. Here, if the ultrasonic wave reflected n-number of times on the medium M is set as an n-th multiple reflection ultrasonic wave and the reception signal at that time is set as an n-th reception signal, the reception timing of the n-th reception signal is an integral multiple of the time $t_1$ from the ultrasonic wave transmission until the reception timing of the primary reception signal ($t_n=nt_1$). If a distance between the ultrasonic transceiver 21 and the medium M is set as d and sound speed is set as c, $t_n=2nd/c$ is satisfied.

Thereafter, the multiple identification unit 253 identifies the added reception signal when the multiple reflection ultrasonic wave is received, based on the added reception signal received in Step S13 as illustrated in FIG. 9 (Step S14). A peak position of the added reception signal may be obtained as follows. For example, the added reception signal is differentiated so as to detect the reception timing of the reception signal in which a differential value is "0" and the signal strength of the added reception signal is equal to or greater than a predetermined second threshold. The n-th reception signal generated by the multiple reflection ultrasonic wave is received at a timing of the integral multiple of the time $t_1$ at which the primary reception signal is received. Therefore, at the peak positions obtained as described above, the respective added reception signals in which the time t from the transmission timing until the reception timing increases up to the integral multiple of $t_1$ is identified, thereby identifying the added reception signal when the multiple reflection ultrasonic wave is received.

Next, the degree setting unit 252 sets the degree of the reception signal to be integrated by the signal integration unit 243, based on the added reception signal as illustrated in FIG. 9 (Step S15). In Step S15, the degree setting unit 252 identifies the reception signal in the maximum degree N in which the signal strength is equal to or greater than the first threshold in the added reception signal, and sets the maximum degree N as the first degree. That is, the maximum degree N in which the signal strength of the N-th reception signal is equal to or greater than the first threshold and the signal strength of the reception signal subsequent to the N+1-th reception signal is smaller than the first threshold is set as the first degree.

The degree setting unit 252 adjusts a gain of the variable gain amplifier 242 so as not to receive the added reception signal subsequent to the N+1-th reception signal. For example, the gain is lowered so that the signal strength of the reception signal subsequent to the N+1-th reception signal is equal to or smaller than a predetermined third threshold. In the manner, the signal strength obtained by the reception signal subsequent to the N+1-th reception signal has a minute value. Therefore, it is possible to suppress an increase in the signal strength when the reception signal is superimposed on the other reception signal.

The parameter setting unit 251 sets a transmission timing (transmission cycle $T_o$) and the integration time τ of the ultrasonic wave, based on the added reception signal obtained in Step S13 (Step S16).

Here, it is preferable that the parameter setting unit 251 sets the transmission cycle $T_o$ of the ultrasonic wave so that a time $t_2$ which is equal to or longer than twice the sampling cycle of the integrated signal sampling unit 244, and during which the secondary multiple reflection ultrasonic wave is received by the ultrasonic transceiver 21 is set as a maximum time. That is, if the transmission cycle $T_o$ of the ultrasonic wave is set to have a value greater than a value of the time $t_2$, the integrated signal does not converge to the constant value. In contrast, since the transmission cycle $T_o$ of the ultrasonic wave is set to be a cycle equal to or shorter than the time $t_2$, the signal strength of the integrated signal can be stabilized to have the constant value.

The parameter setting unit 251 sets the integration time τ at which the signal integration unit 243 integrates the added reception signals. Specifically, τ=2Nd/c is set as the integration time τ. That is, the time $t_n$ from when the ultrasonic wave is transmitted from the ultrasonic transceiver 21 until the N-th multiple reflection ultrasonic wave is received by the ultrasonic transceiver 21 is set as the integration time τ.

Position Detection Process of Medium M

Next, a position detection process of the medium will be described.

Figure 10:
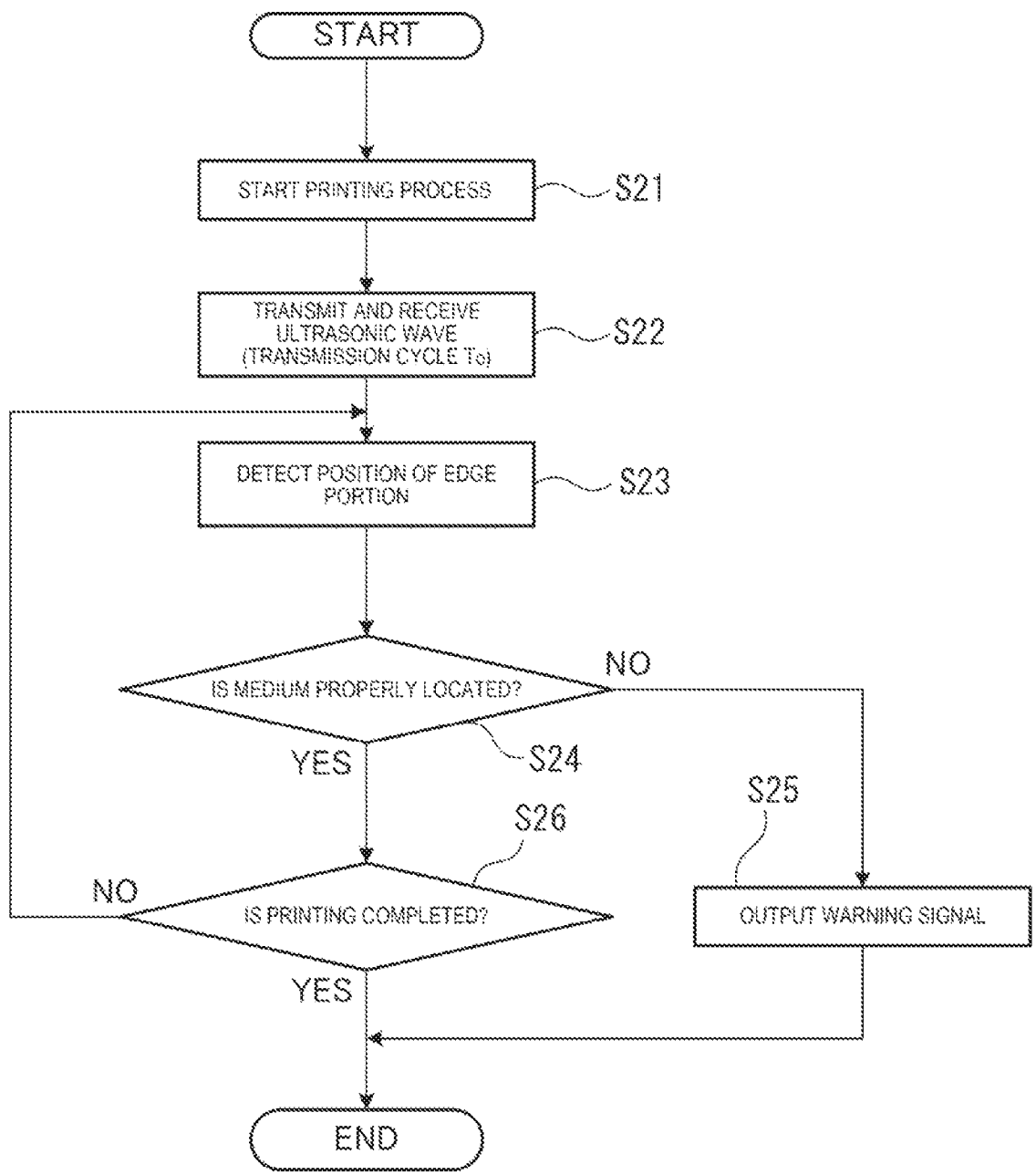
FIG. 10 is a flowchart illustrating a position detection process of the medium according to the first embodiment.

FIG. 10 is a flowchart illustrating the position detection process of the medium M.

The control unit 15 controls the supply unit 11, the transport unit 12, the carriage movement unit 14 and the printing unit 16 so as to transport the medium M in the Y-direction, and starts printing by using the printing unit 16 (Step S21).

For example, in a case where the calibration process is performed during a printing process, if the calibration process is completed, the microcomputer 25 outputs a printing permission signal to the control unit 15. If the printing permission signal is received from the microcomputer 25, the control unit 15 starts to perform the printing process. In a case where the calibration process is completed at the time of turning on the power, the control unit 15 starts to perform the printing process at the timing that an operation signal instructing to start the printing process is input by an operation input from a user.

If the printing process starts, the microcomputer 25 controls the transmission/reception switching unit 22, the transmission circuit unit 23, and the reception circuit unit 24. Based on the parameters set during the calibration process, the ultrasonic wave is transmitted and received by the respective ultrasonic transceivers 21 (Step S22). That is, the microcomputer 25 transmits the ultrasonic wave from the respective ultrasonic transceivers 21 in the transmission cycle $T_o$ set in Step S16.

Figure 11:
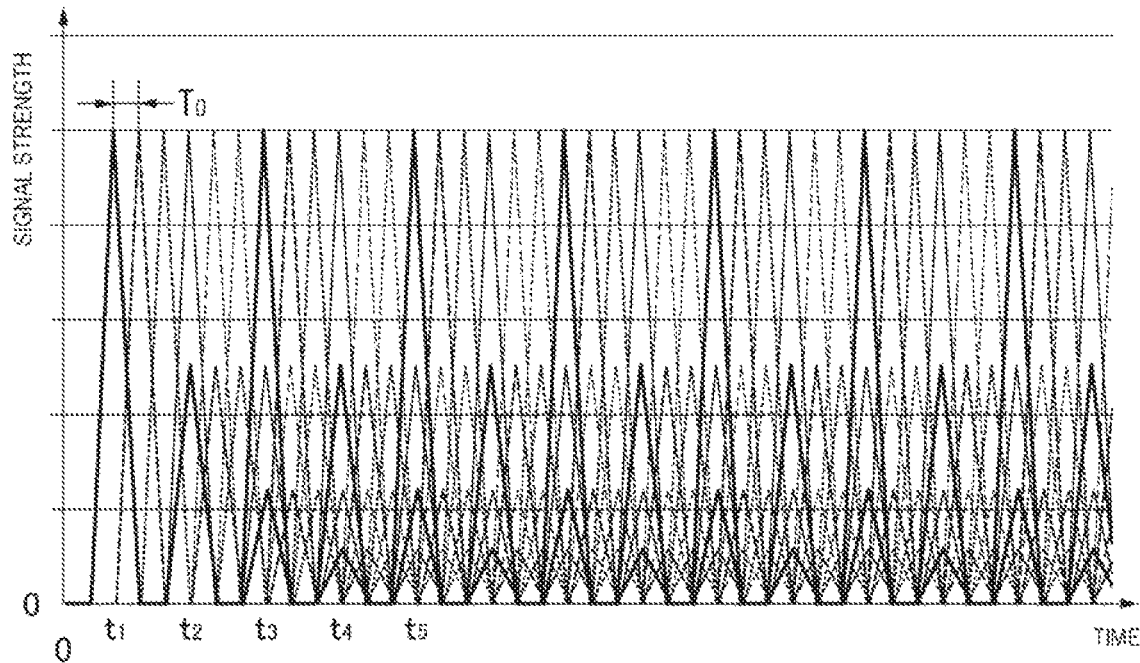
FIG. 11 is a view illustrating an example of a waveform of the reception signal when the ultrasonic wave is transmitted in a transmission cycle, and when the ultrasonic wave is received by the ultrasonic transceiver alone at each ultrasonic wave transmission timing.

FIG. 11 is a view illustrating an example of a waveform of the added reception signal when the ultrasonic wave is transmitted in the transmission cycle $T_o$, and when the ultrasonic wave is received by the ultrasonic transceiver 21 alone at each ultrasonic wave transmission timing. FIG. 11 illustrates signal components at each ultrasonic wave transmission timing which is included in the added reception signal, and in actual, a signal to which the signal components are added is output.

As illustrated in FIG. 11, if the ultrasonic wave is transmitted in the transmission cycle $T_o$, the primary reception signal to the N-th reception signal of the ultrasonic wave transmitted at each ultrasonic wave transmission timing are superimposed one on another.

Figure 12:
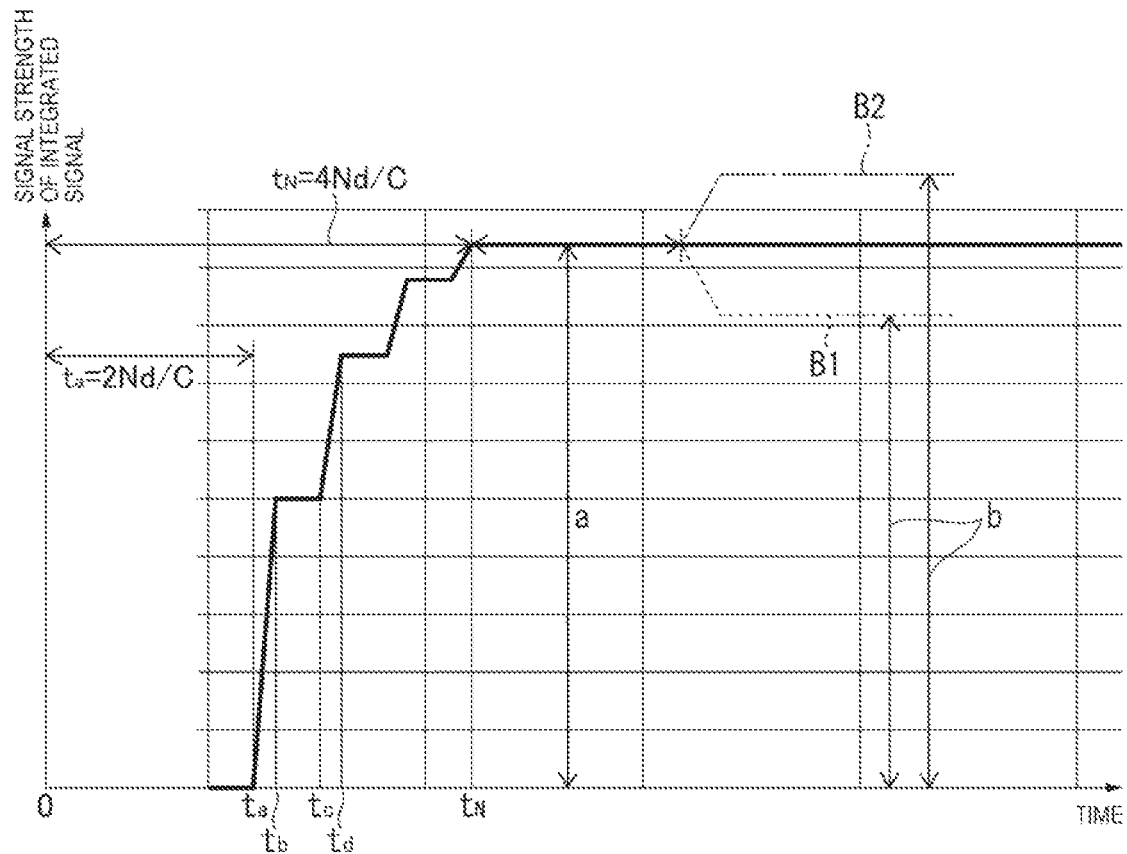
FIG. 12 is a view illustrating an example of a variation in the signal strength of an integrated signal.

FIG. 12 is a view illustrating an example of a variation in the signal strength of the integrated signal.

If the added reception signals output during the integration time τ are integrated by the signal integration unit 243, the signal strength of that integrated signal fluctuates as illustrated in FIG. 12.

In FIG. 12, the timing at which Step S22 starts is set to t=0. The signal integration unit 243 integrates the added reception signals output during the integration time τ=2Nd/c. Accordingly, the integrated signal is output from the timing at which the elapsed time t satisfies t=$t_a$ (=2Nd/c). During a period while the elapsed time t satisfies t=ta to the time t=tb, the integrated value increases since the secondary reception signals of the ultrasonic wave transmitted in the transmission cycle $T_o$ are sequentially added thereto. During a period while the elapsed time t satisfies t=tb to t=tc, the integrated value obtained by integrating the primary reception signal and the secondary reception signal which are generated using each ultrasonic wave transmitted in the transmission cycle $T_o$ is a constant value. During a period while the elapsed time t satisfies t=tc to t=td, the integrated value increases since the third reception signal generated by each ultrasonic wave transmitted in the transmission cycle $T_o$ is added thereto. Thereafter, with the lapse of time, the signal strength of the integrated signal repeatedly increases, and the constant value is repeatedly maintained. If the signal strength of the integrated signal has the constant value at the N-th number of times, as long as the position of the medium M does not fluctuate thereafter, the signal strength of the integrated signal maintains the constant value (reference signal strength a serving as the first reference value).

The position detection unit 254 monitors a signal strength b of the integrated signal output from the signal integration unit 243, and detects a position of the edge portion M1, based on the signal strength b (Step S23). In Step S23, the position detection unit 254 monitors the integrated signal output from the reception circuit unit 24 disposed corresponding to each of the ultrasonic transceivers 21 aligned in the Y-direction.

The signal strength b of the integrated signal is monitored from the timing that the elapsed time t satisfies t=4Nd/c as illustrated in FIG. 12. The position detection unit 254 detects the position of the medium M, based on the increase/decrease amount of the signal strength of the integrated signal with respect to the reference signal strength a.

Here, the reference signal strength a is stored in the internal memory, for example, in a case where the edge detection sensor 20 is set to the environment of the reference environmental value. When detecting the position of the medium M, the position detection unit 254 corrects and uses the reference signal strength stored in the internal memory by using the environmental correction value R. Specifically, the position detection unit 254 corrects the reference signal strength after multiplying the reference environmental value stored in the memory by the environmental correction value R.

Figure 13:
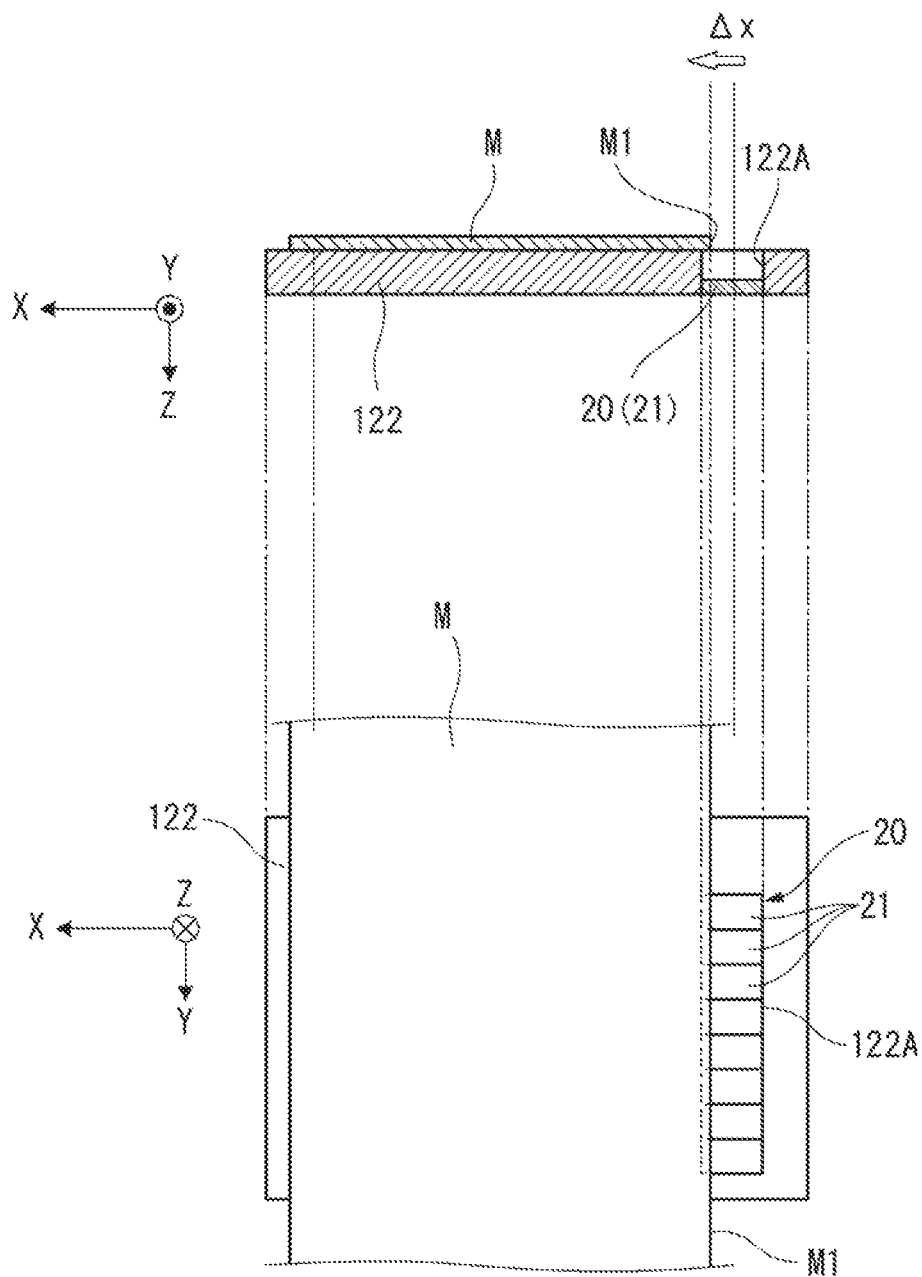
FIG. 13 is a view illustrating a position of the medium with respect to a detection hole when the medium moves to a +X-side as much as Δx.
Figure 14:
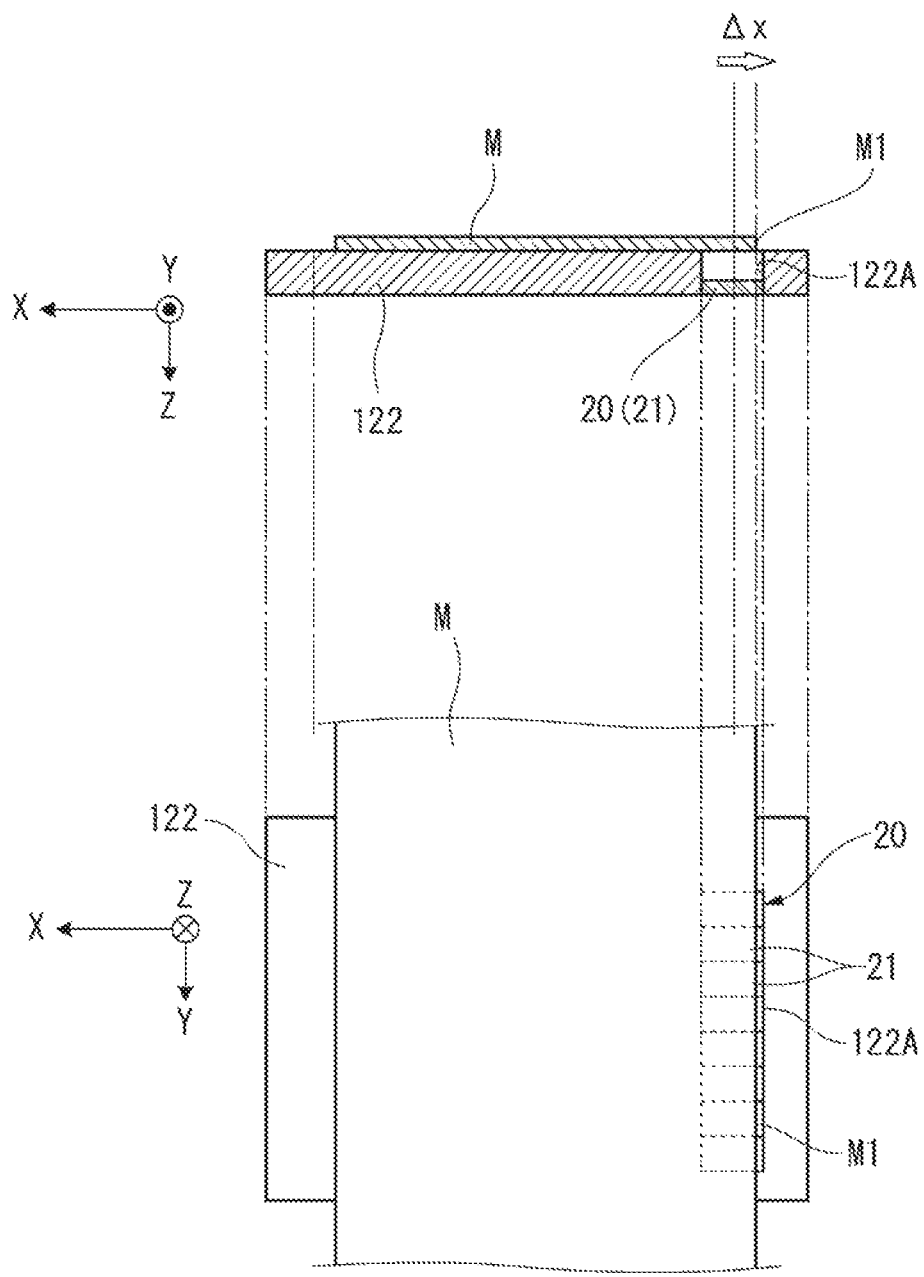
FIG. 14 is a view illustrating a position of the medium with respect to the detection hole when the medium moves to a −X-side as much as Δx.
Figure 15:
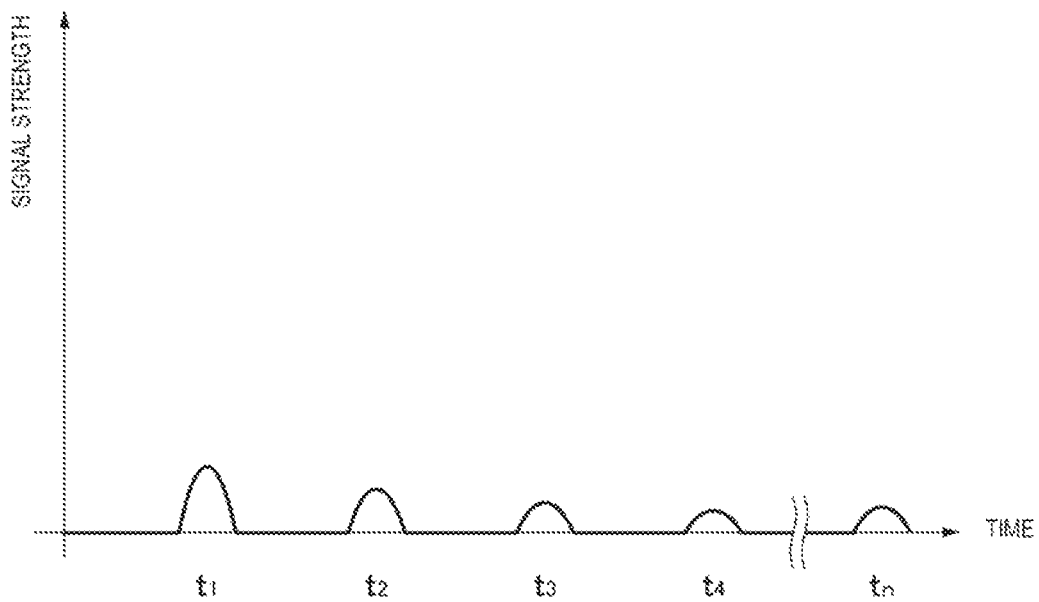
FIG. 15 is a view illustrating an example of a waveform of the reception signal generated by the ultrasonic wave transmitted when the medium moves to the position illustrated in FIG. 12.
Figure 16:
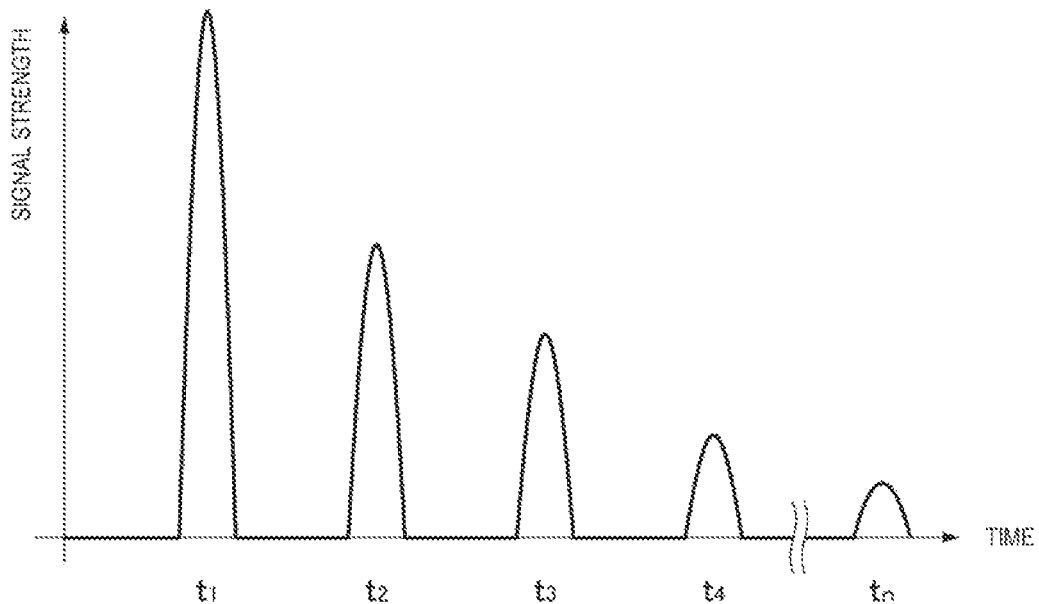
FIG. 16 is a view illustrating an example of a waveform of the reception signal generated by the ultrasonic wave transmitted when the medium moves to the position illustrated in FIG. 13.
Figure 17:
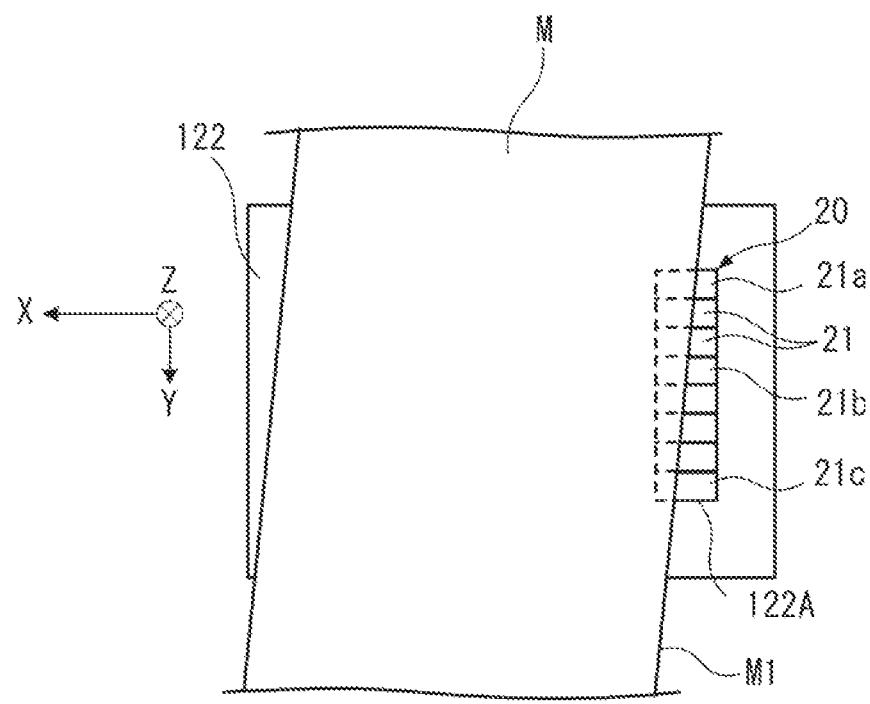
FIG. 17 is a view illustrating a position of the medium with respect to the detection hole when the medium is inclined.
Figure 18:
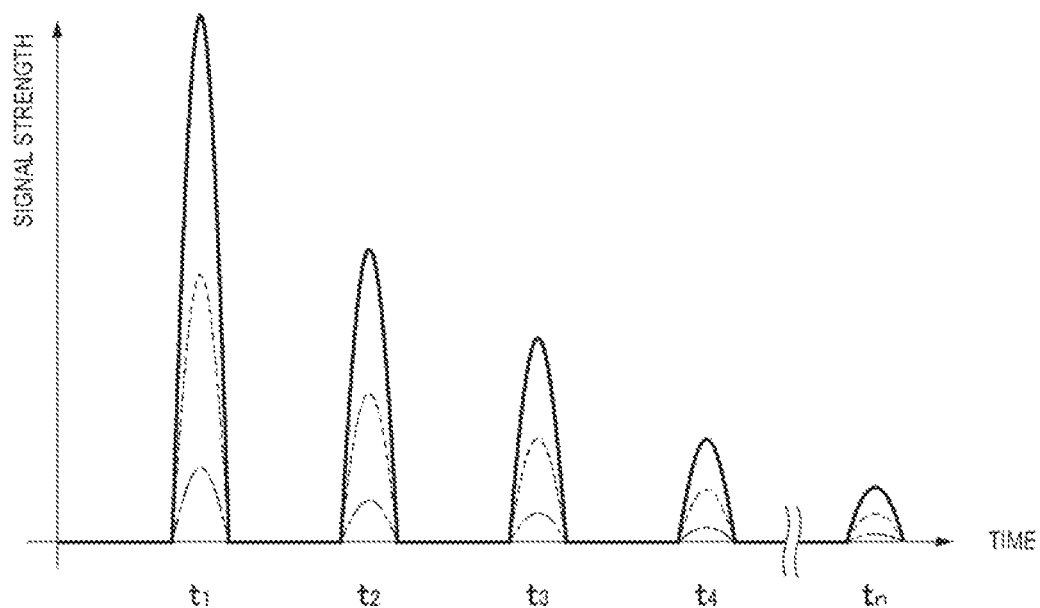
FIG. 18 is a view illustrating an example of a waveform of the reception signal output from each of the ultrasonic transceivers located at different positions in a Y-direction, when the medium moves to the position illustrated in FIG. 17.

FIG. 13 is a view illustrating a position of the medium M relative to the detection hole 122A when the medium M moves to the +X-side as much as Δx. FIG. 14 is a view illustrating a position of the medium M relative to the detection hole 122A when the medium M moves to the −X-side as much as Δx. FIG. 15 is a view illustrating a waveform of the reception signal generated by the ultrasonic wave transmitted when the medium M moves to the position illustrated in FIG. 13. FIG. 16 is a view illustrating a waveform of the reception signal generated by the ultrasonic wave transmitted when the medium M moves to the position illustrated in FIG. 14. FIG. 17 is a view illustrating a position of the medium M relative to the detection hole 122A when the medium M is inclined. FIG. 18 is a view illustrating a waveform of the reception signal output from each of the ultrasonic transceivers 21 arranged at different positions in the Y-direction when the medium M moves to the position illustrated in FIG. 17. In FIG. 18, a solid line indicates the reception signal output from an ultrasonic transceiver 21a in FIG. 17, a broken line indicates the reception signal output from an ultrasonic transceiver 21b in FIG. 17, and a one dot chain line indicates the reception signal output from an ultrasonic transceiver 21c in FIG. 17.

As illustrated in FIG. 13, if the medium M moves to the +X-side, an area of the medium M overlapping each of the ultrasonic transceivers 21 (area of the medium M overlapping the transmission range of the ultrasonic wave) decreases. Therefore, in each of the ultrasonic transceivers 21, the ultrasonic waves reflected on the medium M decrease. As illustrated in FIG. 15, the signal strength of the reception signal output from each of the ultrasonic transceivers 21 decreases. In this case, as illustrated by a line B1 in FIG. 12, the signal strength b of the integrated signal output from the signal integration unit 243 corresponding to each of the ultrasonic transceivers 21 also decreases, and b<a is satisfied.

On the other hand, as illustrated in FIG. 14, if the medium M moves to the −X-side, the area of the medium M overlapping each of the ultrasonic transceivers 21 (area of the medium M overlapping the transmission range of the ultrasonic wave) increases. Therefore, the ultrasonic waves reflected on the medium M increase in each of the ultrasonic transceivers 21, and the signal strength of the reception signal output from each of the ultrasonic transceivers 21 increases as illustrated in FIG. 16. In this case, as illustrated by a line B2 in FIG. 12, the signal strength b of the integrated signal output from the signal integration unit 243 corresponding to each of the ultrasonic transceivers 21 also increases, and b>a is satisfied.

Furthermore, as illustrated in FIG. 17, in a case where the medium M is inclined, the areas of the medium M overlapping with the respective ultrasonic transceivers 21 are different from each other at the respective positions of the ultrasonic transceivers 21. In a case where the medium M is inclined to the +X-side as the medium M faces the +Y-side as illustrated in FIG. 17, as illustrated in FIG. 18, the signal strength of the reception signal output from the ultrasonic transceiver 21 (for example, the ultrasonic transceiver 21a) disposed on the −Y-side is greatest out of a plurality of the ultrasonic transceivers 21. The signal strength of the reception signal output from the ultrasonic transceiver 21 decreases as the medium M faces the +Y-side.

In the examples in FIGS. 17 and 18, the medium M is inclined to the +X-side as the medium M faces the +Y-side. However, in a case where the medium M is inclined to the −X-side as the medium M faces the +Y-side, conversely, the signal strength of the reception signal output from the ultrasonic transceiver 21 increases as the medium M faces the +Y-side.

In Step S23, the position detection unit 254 compares the signal strength b of the integrated signal corresponding to each of the ultrasonic transceivers 21 with the reference signal strength a, and based on the magnitude relationship, the position detection unit 254 detects the position of the edge portion M1.

In this case, the position detection unit 254 calculates the increase/decrease amount of the signal strength b of the integrated signal corresponding to each of the ultrasonic transceivers 21 with respect to the reference signal strength a, and detects the position of the edge portion M1, based on the increase/decrease amount. The position of the edge portion M1 with respect to the increase/decrease amount is stored in the internal memory, for example. In a case where the signal strength of the integrated signal corresponding to a plurality of the ultrasonic transceivers 21 has a uniform increase/decrease amount, the position detection unit 254 detects the parallel movement of the medium M in the X-direction and a movement amount thereof. In a case where the signal strength of the integrated signal corresponding to a plurality of the ultrasonic transceivers 21 varies (for example, increases or decreases) along the Y-direction, the position detection unit 254 can detect the inclination of the medium M and an inclination amount (inclination angle) thereof.

After Step S23, the edge detection sensor 20 outputs the position of the detected edge portion M1 to the control unit 15. The CPU 154 of the control unit 15 determines whether or not the medium M is located at a proper position, based on the input position of the edge portion M1 (Step S24). For example, in a case where the edge detection sensor 20 detects the parallel movement of the medium M in the X-direction, it is determined whether or not the movement amount falls within a predetermined allowable value. In a case where the edge detection sensor 20 detects the inclination of the medium M, it is determined whether or not the inclination amount falls within the predetermined allowable value.

In Step S24, in a case where it is determined as No (in a case where the position of the medium M is not proper), the control unit 15 (CPU 154) outputs a warning signal (Step S25). For example, the control unit 15 controls the supply unit 11, the transport unit 12, the carriage movement unit 14, and the printing unit 16 so as to stop the printing process, and output an alarm indicating the position misalignment of the medium M. For example, the alarm includes displaying an error message on a display connected to the printer 1, lighting of a warning lamp (not illustrated) disposed in the printer 1, an output of the error message, or a warning sound using voice.

On the other hand, in a case where it is determined as Yes in Step S24, the control unit 15 determines whether or not the printing process is completed by the printing unit 16 (Step S26). If it is determined as Yes in Step S26, the control unit 15 stops transmitting the ultrasonic wave in the edge detection sensor 20, and completes the edge detection process. In a case where it is determined as No in Step S26, the process returns to Step S23. For example, until the printing process is completed, the control unit 15 causes the edge detection sensor 20 to continuously perform the position detection process.

Operation Effect of Present Embodiment

The edge detection sensor 20 (ultrasonic sensor) according to the present embodiment includes a plurality of the ultrasonic transceivers 21 arranged in the Y-direction, and the position detection unit 254 which detects the position of the medium M (target), based on the reception signal output from the respective ultrasonic transceivers 21. Based on the reception signal output from the respective ultrasonic transceivers 21, the position detection unit 254 detects the position of the edge portion M1 of the medium M facing the respective ultrasonic transceivers 21, thereby detecting the inclination of the medium M.

That is, according to the present embodiment, as the position misalignment of the medium M, not only the position misalignment of the medium M in a case where the medium M moves parallel in the X-direction, but also the inclination of the medium M can be detected. Therefore, the position of the medium M can be very accurately detected.

The edge detection sensor 20 according to the present embodiment transmits the ultrasonic wave to the medium M from the respective ultrasonic transceivers 21 in the transmission cycle $T_o$ (predetermined interval), and receives the ultrasonic wave reflected on the medium M so as to output the reception signal. The edge detection sensor 20 includes the signal integration unit 243 that outputs the integrated signal obtained by integrating the reception signals output within the integration time $\tau$ (predetermined period), and the position detection unit 254 detects the position misalignment or the inclination of the medium M, based on the magnitude relationship between the signal strength b of the integrated signal and the reference signal strength a (predetermined reference value).

If the position of the medium M does not vary, the signal strength of the integrated signal has the constant value. Therefore, the edge detection sensor 20 according to the present embodiment can more accurately detect the position of the medium M, compared to a case where the position of the medium M is detected using only the signal strength of the reception signal.

It is not necessary to shift the transmission timing of the ultrasonic wave from the reception timing of the multiple reflection ultrasonic wave. Accordingly, it is easy to control the transmission timing of the ultrasonic wave.

Furthermore, the ultrasonic wave can be transmitted in a short period. Accordingly, the position can be very accurately detected for the medium M to be continuously transported. The edge detection process can be performed by the edge detection sensor 20, concurrently with the transportation of the medium M. Therefore, processing speed for the edge detection process and the printing process can be quickened.

The edge detection sensor 20 according to the present embodiment includes the multiple identification unit 253 that identifies the reception signal by using the multiple reflection ultrasonic wave which is reflected multiple times between the medium M and the ultrasonic transceiver 21. After the ultrasonic wave is transmitted, the signal integration unit 243 integrates the reception signals output until the multiple reflection ultrasonic wave in the maximum degree N is received by the ultrasonic transceiver 21 (during the integration time $\tau$).

In this manner, the signal integration unit 243 outputs the integrated signals until the multiple reflection ultrasonic wave is received up to the maximum degree N, that is, until the primary to the N-th reception signals are received. In this way, the order of the reception signals to be integrated is fixed. Accordingly, the reception signal subsequent to the N+1-th reception signal is not superimposed on the integrated signal obtained in a case where the position of the medium M does not vary. Therefore, the signal strength b has a constant value, and the accuracy in detecting the position of the medium M can be improved.

The reception circuit unit 24 includes the noise cut filter 241, can cause the variable gain amplifier 242 to perform the gain adjustment, and can cause the noise cut filter 241 to remove noise components such as short-range noise and spark noise. Therefore, the fluctuation in the signal strength b of the integrated signal can be effectively suppressed in a case where the position of the medium M does not fluctuate. Accordingly, the accuracy in detecting the position of the medium M can be improved.

According to the present embodiment, the respective ultrasonic transceivers 21 have the mutually different frequencies of the ultrasonic waves to be transmitted and received. Therefore, even in a case where the ultrasonic waves are transmitted and received by the ultrasonic transceivers 21 at the same time, crosstalk can be suppressed between the ultrasonic transceiver 21 and the adjacent ultrasonic transceiver 21. In this way, the respective ultrasonic transceivers 21 can accurately perform the transmission/reception process of the ultrasonic wave. Accordingly, the accuracy in detecting the position of the medium M can be improved.

According to the present embodiment, as the environmental correction value R, the parameter setting unit 251 calculates the ratio between the signal strength of the reception signal output from the respective ultrasonic transceivers 21 and the signal strength (second reference value) of the reference reception signal during the calibration in which the medium M is located at the reference position.

In this manner, the environment correction value R is calculated. Accordingly, the reference signal strength a can be corrected using the environmental correction value R, when the position detection unit 254 detects the position of the target. In this manner, the edge detection sensor 20 can detect the position of the medium M, based on the reference signal strength a suitable for the installation environment.

In the printer 1 (electronic device) according to the present embodiment, the control unit 15 (CPU 154) determines whether or not the medium M is a properly located, based on the position of the medium M detected by the edge detection sensor 20. In a case where the position of the medium M is not proper, an error message is outputted, and the printing is not performed by the printing unit 16. In this manner, an image can be printed on a predetermined position of the medium M.

In the printer 1 according to the present embodiment, the transport unit 12 transports the medium M in the Y-direction so that the edge portion M1 of the medium M is parallel to the Y-direction. A plurality of the ultrasonic transceivers 21 of the edge detection sensor 20 are arranged along the Y-direction.

Therefore, in a case where the medium M transported from the transport unit 12 is inclined with respect to the Y-direction, the mutually different reception signals are output from the respective ultrasonic transceivers 21. Accordingly, the inclination of the medium M can be preferably detected.

Second Embodiment

Next, a second embodiment will be described.

In the above-described first embodiment, an example has been described in which the position of the edge portion M1 facing the respective ultrasonic transceivers 21 is detected based on the integrated signal obtained by integrating the reception signals output during the integration time τ. In contrast, the second embodiment is different from the first embodiment in that the position of the edge portion M1 is detected from the respective transmission/reception rows CH configuring the respective ultrasonic transceivers 21.

In the following description, the same reference numerals will be given to the previously described elements, and description thereof will be omitted or simplified.

Figure 19:
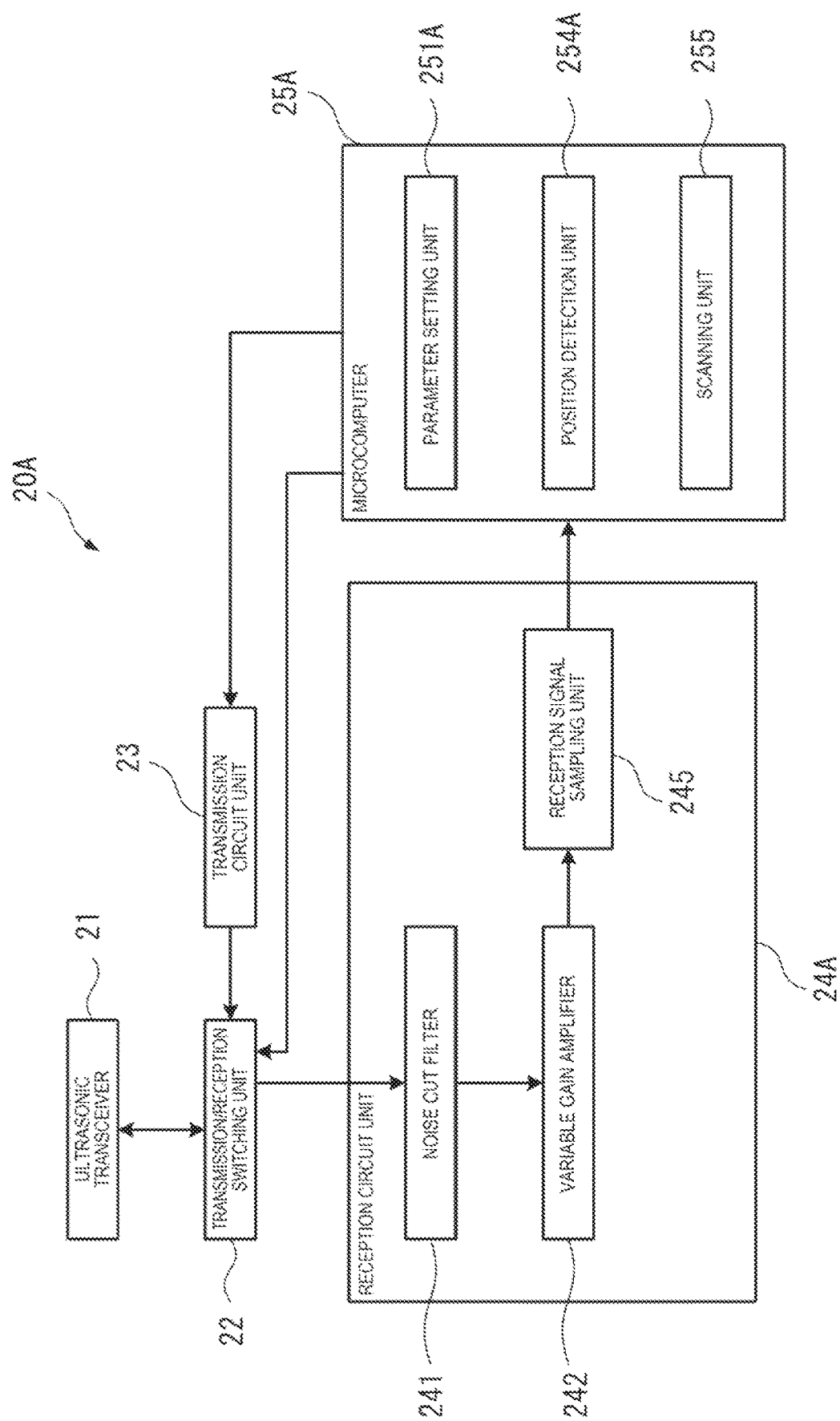
FIG. 19 is a block diagram illustrating a schematic configuration of an edge detection sensor according to a second embodiment.

FIG. 19 is a block diagram illustrating a schematic configuration of an edge detection sensor 20A according to the second embodiment.

As illustrated in FIG. 19, according to the present embodiment, the noise cut filter 241, the variable gain amplifier 242, and the reception signal sampling unit 245 are disposed in a reception circuit unit 24A. That is, the signal integration unit 243 and the integrated signal sampling unit 244 which are illustrated in the first embodiment may not be provided. Accordingly, a configuration of the reception circuit unit 24A can be simplified.

A microcomputer 25A according to the present embodiment functions as a parameter setting unit 251A, a scanning unit 255, and a position detection unit 254A.

The parameter setting unit 251A functions as a ratio calculation unit according to the invention, and calculates the ratio of the signal strength between the reception signal when the medium M is located at the reference position and the reference reception signal.

The scanning unit 255 sequentially drives the transmission/reception rows CH in the respective the ultrasonic transceivers 21.

The position detection unit 254A detects the position in the X-direction of the edge portion M1 facing the respective ultrasonic transceivers 21, based on the transmission/reception result of the ultrasonic wave which is obtained by the scanning unit 255. Based on the position of the edge portion M1 facing the respective ultrasonic transceivers 21, the position misalignment or the inclination of the medium M is detected.

Next, a printing process according to the present embodiment will be described.

In the edge detection sensor 20A according to the present embodiment, in the calibration process illustrated in FIG. 7, processes from Step S13 to Step S16 can be omitted.

Figure 20:
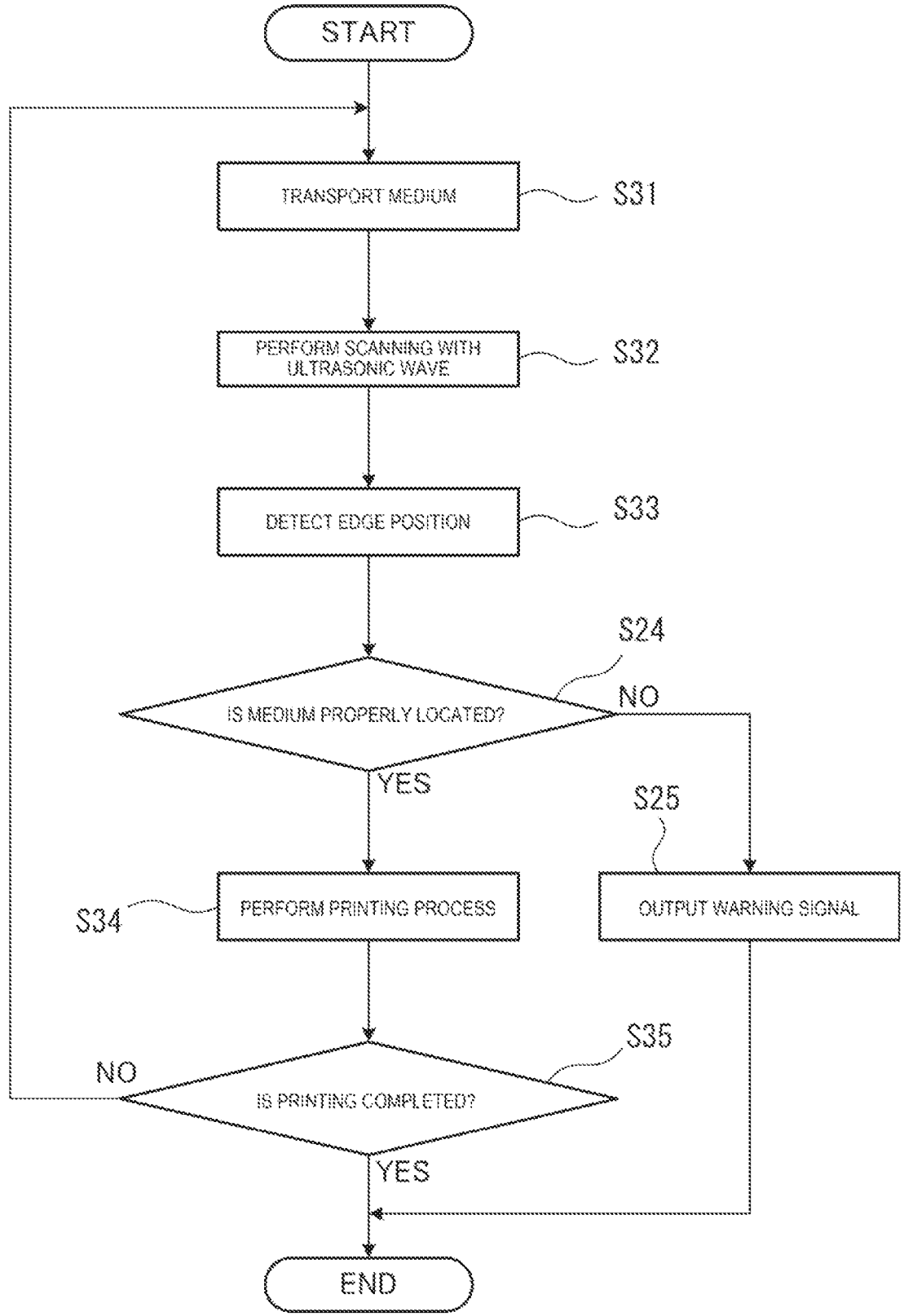
FIG. 20 is a flowchart illustrating a printing process according to the second embodiment.

FIG. 20 is a flowchart of the printing process according to the present embodiment.

In the printing process according to the present embodiment, the control unit 15 transports the medium M to a predetermined position (Step S31).

Thereafter, the scanning unit 255 performs an ultrasonic scanning process (Step S32). That is, the scanning unit 255 sequentially drives the respective transmission/reception rows CH in the respective ultrasonic transceivers 21, and acquires the respective reception signals output from the respective transmission/reception rows CH.

Next, the position detection unit 254A detects the position of the edge portion M1 for each of the ultrasonic transceivers 21, based on the reception signals output from the respective transmission/reception rows CH which are obtained in Step S32 (Step S33).

That is, in the transmission/reception row CH facing the medium M (covered by the medium M) out of the transmission/reception rows CH aligned in the X-direction, the reception signal is maximized. On the other hand, in the transmission/reception row CH facing the edge portion M1, some of the ultrasonic waves are not reflected on the medium M. Accordingly, the signal strength of the reception signal decreases. In the transmission/reception row CH which does not face the medium M, there is no ultrasonic wave reflected on the medium M. Accordingly, a very small reception signal which mainly includes crosstalk components and noise components is output. Therefore, as a position facing the edge portion M1, the position detection unit 254A detects a position where the reception signal varies when the ultrasonic scanning is performed along the X-direction in the respective ultrasonic transceivers 21.

In this case, the reception signal may be corrected using the environmental correction value R calculated using the calibration process. In this case, the position of the edge portion M1 can be detected using the reception signal in which the influence of the environmental value is suppressed.

Through the above-described processes, the position of the edge portion M1 along the Y-direction is detected similarly to the first embodiment. Accordingly, the position detection unit 254A can detect the parallel movement of the medium M along the X-direction or the inclination of the medium M with respect to the Y-direction, and can calculate the movement amount or the inclination amount.

After Step S33, the position detection unit 254A transmits the detected position of the medium M to the control unit 15. In this manner, similarly to Step S24 according to the first embodiment, the control unit 15 determines whether or not the medium M is properly located. In a case where it is determined as No in Step S24, similarly to Step S25, the control unit 15 outputs a warning signal for warning that the medium M is abnormally located.

In a case where it is determined as Yes in Step S24, the control unit 15 controls the printing unit 16 so as to perform printing on the medium M (Step S34).

In Step S34, if the printing is completed by the printing unit, the control unit 15 determines whether or not to complete the printing process (Step S35). In a case where it is determined as No in Step S35 and the printing process is continuously performed, the process returns to Step S31 so as to transport the medium M to a subsequent image forming position. In a case where it is determined as Yes in Step S35, the printing process is completed.

Operation Effect of Present Embodiment

In the ultrasonic sensor according to the present embodiment, the ultrasonic transceiver 21 has a plurality of the transmission/reception rows CH (transmission/reception regions) arranged along the X-direction. The position detection unit 254A sequentially drives a plurality of the transmission/reception rows CH in each of a plurality of the ultrasonic transceivers 21, and detects the position of the edge portion M1, based on the reception signals output from the respective transmission/reception rows CH.

According to this configuration, the position of the edge portion M1 located at the position facing the respective transmission/reception rows CH can be identified. Accordingly, similarly to the first embodiment, it is possible to detect the position misalignment or the inclination of the medium M. The circuit configuration of the reception circuit unit 24 can be simplified, and the reduced cost of the edge detection sensor 20A can be achieved.

MODIFICATION EXAMPLES

The invention is not limited to the above-described embodiments, and includes modifications or improvements within the scope which can achieve the object of the invention.

Modification Example 1

In the above-described first embodiment, an example has been described where the parameter setting unit 251 calculates the environment correction value R. However, the environment correction value R may not be calculated.

In this case, during the calibration process, after Step S16, the microcomputer 25 drives the ultrasonic transceiver 21 in the set transmission cycle $T_o$. The signal strength at the timing when the elapsed time t from the transmission timing of the ultrasonic wave satisfies t=4Nd/c may be set as the reference signal strength a.

Modification Example 2

In the above-described first embodiment, the reference signal strength a is corrected using the environment correction value R, thereby improving the accuracy in detecting the position of the target. However, the invention is not limited thereto.

For example, similarly to the second embodiment, the environment correction value R may be used so as to correct the signal strength of the reception signal output from the respective ultrasonic transceivers 21 (respective transmission/reception rows CH), or the signal strength of the added reception signal.

Modification Example 3

In the above-described first embodiment, an example has been described where the ultrasonic transceiver 21 transmits and receives the ultrasonic waves having the mutually different frequencies. However, for example, a configuration may be adopted in which the ultrasonic wave having the same frequency may be transmitted and received.

In this case, the influence of crosstalk can be suppressed by shifting the driving timing of the ultrasonic transceiver 21 adjacent in the Y-direction. For example, after the edge portion M1 is detected using the ultrasonic transceiver 21 located at an odd-numbered position in the Y-direction, the edge portion M1 is detected using the ultrasonic transceiver 21 located at an even numbered position in the Y-direction.

Modification Example 4

In the first embodiment, the ultrasonic transducer Tr which performs both transmission and reception of the ultrasonic wave is used so that the transmission/reception switching unit 22 switches between the transmission connection and the reception connection. In this manner, the transmission/reception process of the ultrasonic wave is performed. In contrast, the ultrasonic transceiver 21 may be configured to include the ultrasonic transducer Tr for transmitting the ultrasonic wave and the ultrasonic transducer Tr for receiving the ultrasonic wave. In this case, it is possible to suppress the spark noise generated when the transmission connection and the reception connection of the ultrasonic wave are switched therebetween.

In the first embodiment, an example has been described in which the ultrasonic transceiver 21 is located on one side (+Z-side) with respect to the target (medium M). However, the invention is not limited thereto. For example, as the ultrasonic transceiver 21, a configuration may be adopted in which a transmission unit for transmitting the ultrasonic wave and a reception unit for receiving the ultrasonic wave are separated from each other so that the target is interposed between the transmission unit and the reception unit.

FIG. 21 is a schematic view illustrating a schematic configuration of an edge detection sensor according to Modification Example 4.

In an edge detection sensor 20B (ultrasonic sensor) illustrated in FIG. 21, the ultrasonic transceiver 21 is configured to include a transmission unit 21A for transmitting the ultrasonic wave and a reception unit 21B for receiving the ultrasonic wave. The transmission unit 21A is located on one side (for example, on the –Z-side) of the medium M (target), the reception unit 21B is located on the other side (for example, on the +Z-side) of the medium M, and the medium M is located between the transmission unit 21A and the reception unit 21B.

In the edge detection sensor 20B configured in this way, the reception unit 21B receives the ultrasonic wave component which is not blocked by the medium M out of the ultrasonic waves transmitted from the transmission unit 21A. Therefore, if an area increases in a portion where the transmission area for transmitting the ultrasonic wave from the transmission unit 21A and the medium M overlap each other, the signal strength of the reception signal from the reception unit 21B decreases.

In the edge detection sensor 20B, similarly to the above-described first and second embodiments, a plurality of the ultrasonic transceivers 21 including the transmission unit 21A and the reception unit 21B are arranged in the Y-direction. In this manner, similarly to the first and second embodiments, not only the position misalignment caused by the parallel movement of the medium M, but also the inclination of the medium M can be preferably detected.

As illustrated in FIG. 21, in a case where the transmission unit 21A and the reception unit 21B are arranged across the transport position of the medium M, as the reference position of the medium M when the environmental correction value R is calculated, it is possible to employ a position where the medium M is not located between the transmission unit 21A and the reception unit 21B. That is, the edge detection sensor 20B transmits and receives the ultrasonic wave in a state where the medium M is not located between the transmission unit 21A and the reception unit 21B. In this manner, the reception signal having the strong signal strength can be obtained from the reception unit 21B. Therefore, the environmental correction value R can be accurately calculated.

Modification Example 5

In the above-described embodiments, an example has been described in which the edge detection sensor 20 includes a plurality of the ultrasonic transceivers 21 aligned along the Y-direction. However, the invention is not limited thereto.

FIG. 22 is a view illustrating a located example of the ultrasonic transceiver 21 of an edge detection sensor 20C according to Modification Example 5.

As illustrated in FIG. 22, the edge detection sensor 20C may be configured to include a plurality of the ultrasonic transceivers 21 aligned in a direction inclined with respect to the Y-direction. In this case, an angle formed between the location direction (first direction) of the ultrasonic transceiver 21 and the transport direction (third direction) of the medium M is caused to fall within an allowable angle $\zeta$ when the medium M is transported by the transport unit 12.

In the edge detection sensor 20C configured in this way, when the medium M is inclined up to a limit angle permitted by the transport unit 12, the same reception signal is output from the respective ultrasonic transceivers 21. On the other hand, if the medium M is normally transported in the Y-direction and the edge portion M1 is parallel to the Y-direction, the reception signals output from the ultrasonic transceivers 21 have mutually different values.

Modification Example 6

In the above-described first embodiment, a configuration has been adopted in which the respective ultrasonic transceivers 21 include a plurality of the transmission/reception rows CH aligned in the X-direction so that the transmission/reception rows CH can be independently driven. However, the invention is not limited thereto.

For example, a configuration may be adopted in which one ultrasonic transducer Tr is provided for one ultrasonic transceiver 21. Alternatively, a configuration may be adopted as follows. A plurality of the ultrasonic transducers Tr are provided for one ultrasonic transceiver 21, first electrodes 212A of the respective ultrasonic transducers Tr are connected to each other, and second electrodes 212C are also connected to each other so as to be used in common. Even in this case, the reception signals output from the respective ultrasonic transceivers 21 are integrated, and the integrated signals are monitored. In this manner, the position misalignment or the inclination of the medium M can be detected.

Figure 23:
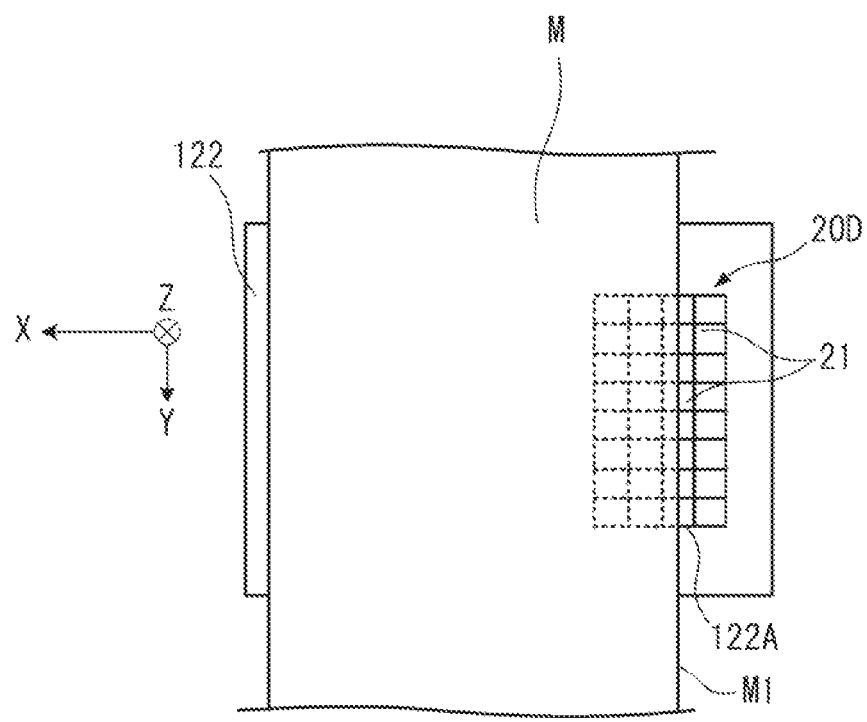
FIG. 23 is a view illustrating a located example of an ultrasonic transceiver of an edge detection sensor according to Modification Example 6.

As in the edge detection sensor 20D illustrated in FIG. 23, the above-described ultrasonic transceivers 21 may be arranged in a two-dimensional array in the X-direction and the Y-direction. In this case, a configuration is adopted as follows. When the medium M is located at the reference position, at least one ultrasonic transceiver 21 to be covered by the medium M is provided. In this manner, similar to the above-described first embodiment, the environmental correction value R can be very accurately calculated.

Modification Example 7

In the above-described embodiments, an example has been described in which the edge detection sensors 20 and 20A detect the edge portion M1 on the −X-side of the medium M which is transported in the Y-direction in the printer 1. However, the invention is not limited thereto. The ultrasonic device and the ultrasonic measurement method according to the invention can be used for various purposes of detecting the movement or the position of the target. For example, in a manufacturing apparatus of a factory, the invention is applicable to the ultrasonic device which determines whether or not a workpiece is moved to a predetermined position when processing work is carried out by moving the workpiece to the predetermined position.

Modification Example 8

In the above-described embodiment, an example has been described in which paper is used as the medium M. However, the invention is not limited thereto. Various media such as vinyl chloride and cloth may be used.

Alternatively, the specific structures for embodying the invention can be appropriately changed to other structures within the scope which can achieve the object of the invention.

The entire disclosure of Japanese Patent Application No. 2018-050565, filed Mar. 19, 2018 is expressly incorporated by reference herein.

What is claimed is:

1. An ultrasonic sensor comprising:
   an ultrasonic transceiver that transmits and receives an ultrasonic wave, and that outputs a reception signal by receiving the ultrasonic wave; and
   a position detection unit that detects a position of a target facing the ultrasonic transceiver, based on the reception signal,
   wherein a plurality of the ultrasonic transceivers are arranged along a first direction, and
   wherein the position detection unit detects inclination of the target with respect to the first direction, based on the reception signals output from a plurality of the ultrasonic transceivers.

2. The ultrasonic sensor according to claim 1, further comprising:
   a signal integration unit that outputs an integrated signal by integrating the reception signals output during a predetermined period,
   wherein the position detection unit detects the position of the target, based on a magnitude relationship between signal strength of the integrated signal and a predetermined first reference value in each of a plurality of the ultrasonic transceivers, and detects the inclination of the target, based on the position of the target with respect to each of the ultrasonic transceivers.

3. An electronic device comprising:
   the ultrasonic sensor according to claim 2; and
   a position determination unit that determines whether or not the target is properly located, based on the position of the target detected by the ultrasonic sensor.

4. The ultrasonic sensor according to claim 1,
   wherein the ultrasonic transceiver has a plurality of transmission/reception regions arranged along a second direction intersecting the first direction, and
   wherein the position detection unit detects the position of the target, based on the reception signal output from each of a plurality of the transmission/reception regions in each of a plurality of the ultrasonic transceivers, and detects the inclination of the target, based on the position of the target with respect to each of the ultrasonic transceivers.

5. An electronic device comprising:
the ultrasonic sensor according to claim 4; and
a position determination unit that determines whether or not the target is properly located, based on the position of the target detected by the ultrasonic sensor.

6. The ultrasonic sensor according to claim 1,
wherein a plurality of the ultrasonic transceivers respectively have mutually different frequencies of the ultrasonic waves to be transmitted and received.

7. An electronic device comprising:
the ultrasonic sensor according to claim 6; and
a position determination unit that determines whether or not the target is properly located, based on the position of the target detected by the ultrasonic sensor.

8. The ultrasonic sensor according to claim 1, further comprising:
a ratio calculation unit that calculates a ratio between signal strength of the reception signal output when the target is located at a reference position and a predetermined second reference value.

9. An electronic device comprising:
the ultrasonic sensor according to claim 8; and
a position determination unit that determines whether or not the target is properly located, based on the position of the target detected by the ultrasonic sensor.

10. An electronic device comprising:
the ultrasonic sensor according to claim 1; and
a position determination unit that determines whether or not the target is properly located, based on the position of the target detected by the ultrasonic sensor.

11. The electronic device according to claim 10, further comprising:
a transport unit that transports the target in which a portion of an outer peripheral edge is a linear edge portion so that a linear direction of the edge portion falls within a predetermined allowable angle with respect to a predetermined third direction,
wherein an angle formed between the first direction and the third direction is smaller than the allowable angle.

12. The electronic device according to claim 11,
wherein the first direction and the third direction are the same as each other.

* * * * *